United States Patent
Ryu et al.

(10) Patent No.: US 10,290,418 B2
(45) Date of Patent: May 14, 2019

(54) APPARATUS AND METHOD FOR RESONANCE IN WIRELESS POWER TRANSMISSION SYSTEM

(71) Applicant: Samsung Electronics Co., Ltd., Suwon-si (KR)

(72) Inventors: Young Ho Ryu, Yongin-si (KR); Sang Wook Kwon, Seongnam-si (KR); Ki Young Kim, Yongin-si (KR); Nam Yun Kim, Seoul (KR); Dong Zo Kim, Yongin-si (KR); Yun Kwon Park, Dongducheon-si (KR); Keum Su Song, Seoul (KR); Chi Hyung Ahn, Suwon-si (KR); Chang Wook Yoon, Seoul (KR); Jin Sung Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 438 days.

(21) Appl. No.: 14/142,571

(22) Filed: Dec. 27, 2013

(65) Prior Publication Data

US 2014/0183967 A1 Jul. 3, 2014

(30) Foreign Application Priority Data

Dec. 27, 2012 (KR) .......................... 10-2012-0154708

(51) Int. Cl.
| | | |
|---|---|---|
| *H02J 50/00* | (2016.01) | |
| *H01F 38/14* | (2006.01) | |
| *H02J 50/80* | (2016.01) | |
| *H02J 50/90* | (2016.01) | |
| *H02J 50/40* | (2016.01) | |
| *H02J 50/12* | (2016.01) | |
| *B60L 11/18* | (2006.01) | |
| *H02J 7/02* | (2016.01) | |

(52) U.S. Cl.
CPC ............. *H01F 38/14* (2013.01); *B60L 11/182* (2013.01); *H02J 7/025* (2013.01); *H02J 50/12* (2016.02);
(Continued)

(58) Field of Classification Search
CPC .. H02J 50/10; H02J 50/12; H02J 50/80; H02J 50/90
(Continued)

(56) References Cited

U.S. PATENT DOCUMENTS

2007/0246546 A1* 10/2007 Yoshida ............... G06K 7/0008
235/492
2010/0244576 A1* 9/2010 Hillan .................. G06K 7/0008
307/104
(Continued)

FOREIGN PATENT DOCUMENTS

KR 10-2011-0009229 A 1/2011
WO WO 2010/090539 A1 8/2010

OTHER PUBLICATIONS

Office Action dated Jan. 3, 2019 by the Korean Intellectual Property Office in counterpart Korean Patent Application No. 10-2012-0154708.

*Primary Examiner* — Adi Amrany
(74) *Attorney, Agent, or Firm* — Sughrue Mion, PLLC

(57) ABSTRACT

A resonant apparatus in a wireless power transmission system, includes a main resonant unit configured to form magnetic resonant coupling between the resonant apparatus and a resonator. The resonant apparatus further includes a field guiding resonant unit configured to focus a magnetic field on an internal portion of the main resonant unit, and a field additive resonant unit configured to adjust a magnitude of a magnetic field formed between the main resonant unit and the field guiding resonant unit.

8 Claims, 21 Drawing Sheets

(52) U.S. Cl.
CPC .............. *H02J 50/40* (2016.02); *H02J 50/80* (2016.02); *H02J 50/90* (2016.02); *Y02T 10/7005* (2013.01); *Y02T 10/7072* (2013.01); *Y02T 90/122* (2013.01); *Y02T 90/14* (2013.01)

(58) Field of Classification Search
USPC ........................................................ 307/104
See application file for complete search history.

(56) References Cited

U.S. PATENT DOCUMENTS

| | | | | |
|---|---|---|---|---|
| 2011/0169337 | A1* | 7/2011 | Kozakai | H02J 5/005 307/104 |
| 2011/0248570 | A1* | 10/2011 | Hong | H02J 5/005 307/104 |
| 2011/0304216 | A1* | 12/2011 | Baarman | H02J 17/00 307/104 |
| 2012/0149307 | A1* | 6/2012 | Terada | H02J 7/025 455/66.1 |
| 2012/0267960 | A1* | 10/2012 | Low | H04B 5/0037 307/104 |
| 2012/0280575 | A1* | 11/2012 | Kim | H02J 17/00 307/104 |
| 2012/0293007 | A1* | 11/2012 | Byun | H02J 17/00 307/104 |
| 2012/0300872 | A1* | 11/2012 | Kim | H01P 5/02 375/295 |
| 2014/0159508 | A1* | 6/2014 | Sankar | H02J 17/00 307/149 |

\* cited by examiner

1400

APPARATUS AND METHOD FOR RESONANCE IN WIRELESS POWER TRANSMISSION SYSTEM

CROSS-REFERENCE TO RELATED APPLICATION

This application claims the benefit under 35 USC 119(a) of Korean Patent Application No. 10-2012-0154708, filed on Dec. 27, 2012, in the Korean Intellectual Property Office, the entire disclosure of which is incorporated herein by reference for all purposes.

BACKGROUND

1. Field

The following description relates to a wireless power transmission system.

2. Description of Related Art

A wireless power refers to energy that is transferred from a wireless power transmitter to a wireless power receiver through magnetic resonant coupling. Accordingly, a wireless power transmission system or a wireless power charging system includes a source device and a target device. The source device may wirelessly transmit a power, and the target device may wirelessly receive a power. The source device may be referred to as a source or a wireless power transmitter, and the target device may be referred to as a target or a wireless power receiver.

The source device includes a source resonator, and the target device includes a target resonator. The source resonator and the target resonator may form magnetic resonant coupling.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a resonant apparatus in a wireless power transmission system, includes a main resonant unit configured to form magnetic resonant coupling between the resonant apparatus and a resonator. The resonant apparatus further includes a field guiding resonant unit configured to focus a magnetic field on an internal portion of the main resonant unit, and a field additive resonant unit configured to adjust a magnitude of a magnetic field formed between the main resonant unit and the field guiding resonant unit.

The field guiding resonant unit may be disposed in the internal portion of the main resonant unit, and the field additive resonant unit may be disposed between the main resonant unit and the field guiding resonant unit.

A resonant frequency of the field guiding resonant unit may be controlled by a controller.

A resonant frequency of the field guiding resonant unit may be greater than or equal to an operating frequency of the resonant apparatus.

The field additive resonant unit may include sub-resonant units, and each of the sub-resonant units may be turned ON and OFF by a controller.

The controller may be configured to detect a misalignment between the main resonant unit and the resonator, and control an entirety or a portion of the sub-resonant units to be turned ON or OFF, based on the misalignment.

The controller may be configured to detect a portion of the resonant apparatus that needs an enhancement of a magnetic field based on the misalignment, and control a switch of a sub-resonant unit disposed in the portion, among the sub-resonant units, to be turned OFF.

The controller may be configured to detect a portion of the resonant apparatus that needs a cancellation of a magnetic field based on the misalignment, and control a switch of a sub-resonant unit disposed in the portion, among the sub-resonant units, to be turned ON.

Each of the sub-resonant units may include a capacitor and a switch connected in parallel to the capacitor.

The controller may be configured to receive state information from a wireless power receiver, and determine an amount of power to be transmitted by the resonant apparatus, and whether each of the sub-resonant units is to be turned ON or OFF, based on the state information.

The state information may include information of an amount of current or power received by the wireless power receiver through the magnetic resonant coupling.

Each of the main resonant unit and the field guiding resonant unit may include a circular loop or a rectangular loop.

The field additive resonant unit may include circular loop conductors connected to the main resonant unit.

The field guiding resonant unit and the field additive resonant unit may include a loop in which ends of the field guiding resonant unit are connected to ends of the field additive resonant unit, and a width of the field guiding resonant unit may be narrower than a width of the field additive resonant unit.

In another general aspect, a method of controlling a resonance in a wireless power transmission system, includes forming magnetic resonant coupling between a resonant apparatus and a resonator, and detecting a misalignment between the resonant apparatus and the resonator. The method further includes controlling an entirety or a portion of sub-resonant units of the resonant apparatus to be turned ON or OFF, based on the misalignment.

The controlling may include receiving information of an amount of current or power received by a wireless power receiver through the magnetic resonant coupling, periodically, and determining an amount of power to be transmitted by the resonant apparatus, and whether each of the sub-resonant units is to be turned ON or OFF, based on the information.

The controlling may include detecting a portion of the resonant apparatus that needs an enhancement of a magnetic field based on the misalignment, and controlling a switch of a sub-resonant unit disposed in the portion, among the sub-resonant units, to be turned OFF.

The controlling may include detecting a portion of the resonant apparatus that needs a cancellation of a magnetic field based on the misalignment, and controlling a switch of a sub-resonant unit disposed in the portion, among the sub-resonant units, to be turned ON.

In still another general aspect, a controller includes a processor configured to detect a misalignment between a resonant apparatus and a resonator, and control each of sub-resonant units of the resonant apparatus to be turned ON and OFF based on the misalignment.

The resonant apparatus may include a main resonant unit configured to form magnetic resonant coupling between the resonant apparatus and the resonator, and a field guiding resonant unit configured to focus a magnetic field on an internal portion of the main resonant unit. The resonant apparatus may further include the sub-resonant units configured to adjust a magnetic field formed between the main resonant unit and the field guiding resonant unit.

Other features and aspects will be apparent from the following detailed description, the drawings, and the claims.

Figure 1:
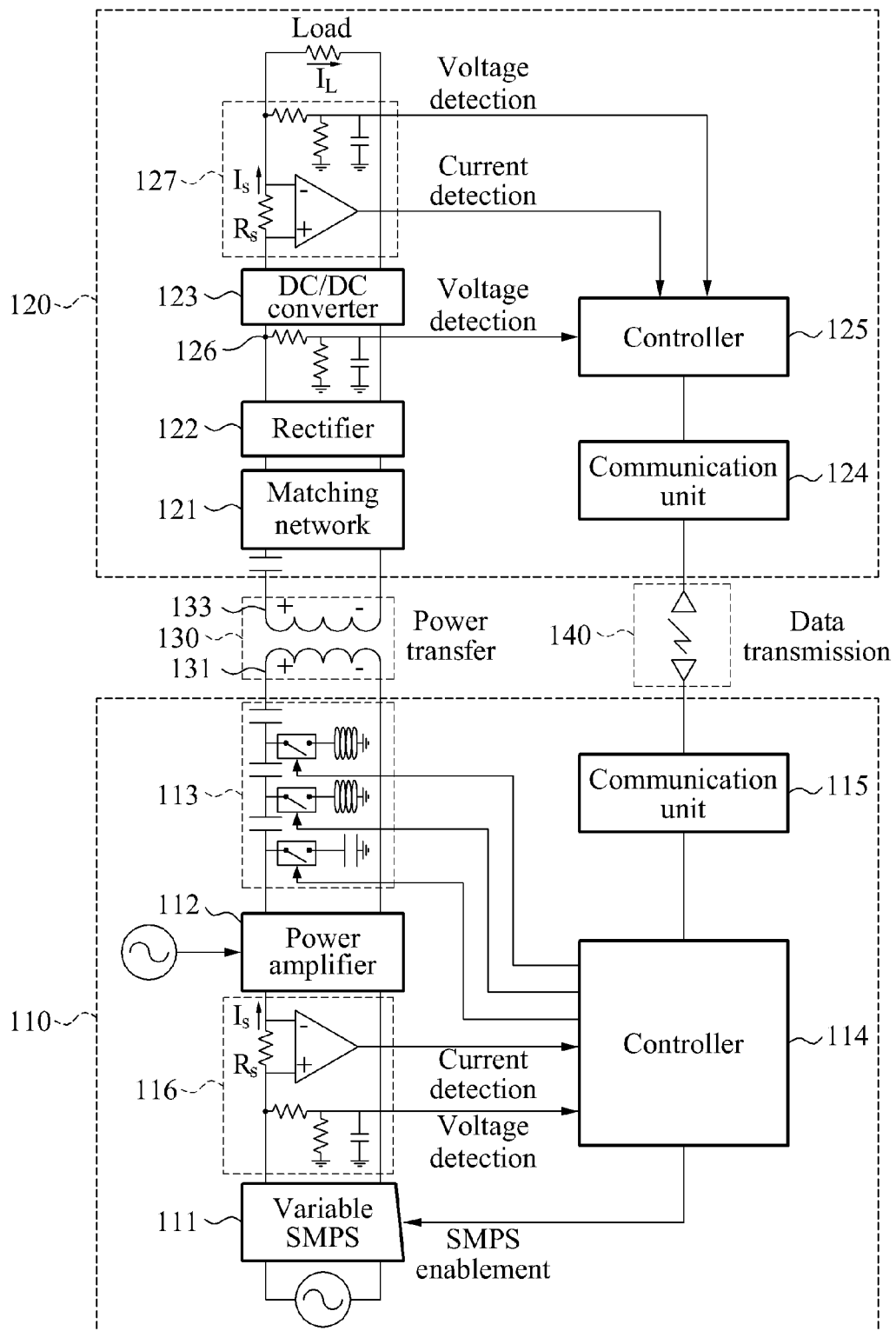
FIG. 1 is a diagram illustrating an example of a wireless power transmission system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of a wireless power transmission system. Referring to FIG. 1, the wireless power transmission system includes a source device 110 and a target device 120. The source device 110 is a device supplying wireless power, and may be any of various devices that supply power, such as pads, terminals, televisions (TVs), and any other device that supplies power. The target device 120 is a device receiving wireless power, and may be any of various devices that consume power, such as terminals, TVs, vehicles, washing machines, radios, lighting systems, and any other device that consumes power.

The source device 110 includes a variable switching mode power supply (SMPS) 111, a power amplifier 112, a matching network 113, a transmission (TX) controller 114, a communication unit 115, a power detector 116, and a source resonator 131. The target device 120 includes a matching network 121, a rectifier 122, a direct current-to-direct current (DC/DC) converter 123, a communication unit 124, a reception (RX) controller 125, a power detector 127, and a target resonator 133.

The variable SMPS 111 generates a DC voltage by switching an alternating current (AC) voltage having a frequency of tens of hertz (Hz) output from a power supply. The variable SMPS 111 may output a DC voltage having a predetermined level, or may output a DC voltage having an adjustable level by the TX controller 114.

The power detector 116 detects an output current and an output voltage of the variable SMPS 111, and provides, to the TX controller 114, information on the detected current and the detected voltage. Additionally, the power detector 116 detects an input current and an input voltage of the power amplifier 112.

The power amplifier 112 generates a power by converting the DC voltage output from the variable SMPS 111 to an AC voltage using a switching pulse signal having a frequency of a few kilohertz (kHz) to tens of megahertz (MHz). In other words, the power amplifier 112 converts a DC voltage supplied to a power amplifier to an AC voltage using a reference resonance frequency $F_{Ref}$, and generates a communication power to be used for communication, or a charging power to be used for charging that may be used in a plurality of target devices. The communication power may be, for example, a low power of 0.1 to 1 milliwatts (mW) that may be used by a target device to perform communication, and the charging power may be, for example, a high power of 1 mW to 200 Watts (W) that may be consumed by a device load of a target device. In this description, the term "charging" may refer to supplying power to an element or a unit that charges a battery or other rechargeable device with power. Also, the term "charging" may refer supplying power to an element or a unit that consumes power. For example, the term "charging power" may refer to power consumed by a target device while operating, or power used to charge a battery of the target device. The unit or the element may include, for example, a battery, a display device, a sound output circuit, a main processor, and various types of sensors.

In this description, the term "reference resonance frequency" refers to a resonance frequency that is nominally used by the source device 110, and the term "tracking frequency" refers to a resonance frequency used by the source device 110 that has been adjusted based on a predetermined scheme.

The TX controller 114 may detect a reflected wave of the communication power or a reflected wave of the charging power, and may detect mismatching between the target resonator 133 and the source resonator 131 based on the detected reflected wave. The TX controller 114 may detect the mismatching by detecting an envelope of the reflected wave, or by detecting an amount of a power of the reflected wave.

Under the control of the TX controller 114, the matching network 113 compensates for impedance mismatching between the source resonator 131 and the target resonator 133 so that the source resonator 131 and the target resonator 133 are optimally-matched. The matching network 113 includes combinations of a capacitor and an inductor that are connected to the TX controller 114 through a switch, which is under the control of the TX controller 114.

The TX controller 114 may calculate a voltage standing wave ratio (VSWR) based on a voltage level of the reflected wave and a level of an output voltage of the source resonator 131 or the power amplifier 112. When the VSWR is greater than a predetermined value, the TX controller 114 detects the mismatching. In this example, the TX controller 114 calculates a power transmission efficiency of each of N predetermined tracking frequencies, determines a tracking frequency $F_{Best}$ having the best power transmission efficiency among the N predetermined tracking frequencies, and changes the reference resonance frequency $F_{Ref}$ to the tracking frequency $F_{Best}$.

Also, the TX controller 114 may control a frequency of the switching pulse signal used by the power amplifier 112. By controlling the switching pulse signal used by the power amplifier 112, the TX controller 114 may generate a modulation signal to be transmitted to the target device 120. In other words, the communication unit 115 may transmit various messages to the target device 120 via in-band communication. Additionally, the TX controller 114 may detect a reflected wave, and may demodulate a signal received from the target device 120 through an envelope of the reflected wave.

The TX controller 114 may generate a modulation signal for in-band communication using various schemes. To generate a modulation signal, the TX controller 114 may turn on or off the switching pulse signal used by the power amplifier 112, or may perform delta-sigma modulation. Additionally, the TX controller 114 may generate a pulse-width modulation (PWM) signal having a predetermined envelope.

The communication unit 115 may perform out-of-band communication using a communication channel. The communication unit 115 may include a communication module, such as a ZigBee module, a Bluetooth module, or any other communication module, that the communication unit 115 may use to perform the out-of-band communication. The communication unit 115 may transmit or receive data 140 to or from the target device 120 via the out-of-band communication.

The source resonator 131 transfers electromagnetic energy 130, such as the communication power or the charging power, to the target resonator 133 via a magnetic coupling with the target resonator 133.

The target resonator 133 receives the electromagnetic energy 130, such as the communication power or the charging power, from the source resonator 131 via a magnetic coupling with the source resonator 131. Additionally, the target resonator 133 receives various messages from the source device 110 via the in-band communication.

The matching network 121 matches an input impedance viewed from the source device 110 to an output impedance viewed from a load. The matching network 121 may be configured with a combination of a capacitor and an inductor.

The rectifier 122 generates a DC voltage by rectifying an AC voltage received by the target resonator 133.

The DC/DC converter 123 adjusts a level of the DC voltage output from the rectifier 122 based on a voltage rating of the load. For example, the DC/DC converter 123 may adjust the level of the DC voltage output from the rectifier 122 to a level in a range from 3 volts (V) to 10 V.

The power detector 127 detects a voltage (e.g., $V_{dd}$) of an input terminal 126 of the DC/DC converter 123, and a current and a voltage of an output terminal of the DC/DC converter 123. The power detector 127 outputs the detected voltage of the input terminal 126, and the detected current and the detected voltage of the output terminal, to the RX controller 125. The RX controller 125 uses the detected voltage of the input terminal 126 to compute a transmission efficiency of power received from the source device 110. Additionally, the RX controller 125 uses the detected current and the detected voltage of the output terminal to compute an amount of power transferred to the load. The TX controller 114 of the source device 110 determines an amount of power that needs to be transmitted by the source device 110 based on an amount of power required by the load and the amount of power transferred to the load. When the communication unit 124 transfers an amount of power of the output terminal (e.g., the computed amount of power transferred to the load) to the source device 110, the TX controller 114 of the source device 110 may compute the amount of power that needs to be transmitted by the source device 110.

The communication unit 124 may perform in-band communication for transmitting or receiving data using a resonance frequency by demodulating a received signal obtained by detecting a signal between the target resonator 133 and the rectifier 122, or by detecting an output signal of the rectifier 122. In other words, the RX controller 125 may demodulate a message received via the in-band communication.

Additionally, the RX controller 125 may adjust an impedance of the target resonator 133 to modulate a signal to be transmitted to the source device 110. For example, the RX controller 125 may increase the impedance of the target resonator so that a reflected wave will be detected by the TX controller 114 of the source device 110. In this example, depending on whether the reflected wave is detected, the TX controller 114 of the source device 110 will detect a binary number "0" or "1".

The communication unit 124 may transmit, to the source device 110, any one or any combination of a response message including a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a frequency band used the corresponding target device, an amount of power to be used by the corresponding target device, an intrinsic identifier of the corresponding target device, product version information of the corresponding target device, and standards information of the corresponding target device.

The communication unit 124 may also perform an out-of-band communication using a communication channel. The communication unit 124 may include a communication module, such as a ZigBee module, a Bluetooth module, or any other communication module known in the art, that the communication unit 124 may use to transmit or receive data 140 to or from the source device 110 via the out-of-band communication.

The communication unit 124 may receive a wake-up request message from the source device 110, detect an amount of a power received by the target resonator, and transmit, to the source device 110, information about the amount of the power received by the target resonator. In this example, the information about the amount of the power received by the target resonator may correspond to an input voltage value and an input current value of the rectifier 122, an output voltage value and an output current value of the rectifier 122, or an output voltage value and an output current value of the DC/DC converter 123.

The TX controller 114 sets a resonance bandwidth of the source resonator 131. Based on the resonance bandwidth of the source resonator 131, a Q-factor $Q_S$ of the source resonator 131 is set.

The RX controller 125 sets a resonance bandwidth of the target resonator 133. Based on the resonance bandwidth of the target resonator 133, a Q-factor $Q_D$ of the target resonator 133 is set. For example, the resonance bandwidth of the source resonator 131 may be set to be wider or narrower than the resonance bandwidth of the target resonator 133.

The source device 110 and the target device 120 communicate with each other to share information about the resonance bandwidth of the source resonator 131 and the resonance bandwidth of the target resonator 133. If power desired or needed by the target device 120 is greater than a reference value, the Q-factor $Q_S$ of the source resonator 131 may be set to be greater than 100. If the power desired or needed by the target device 120 is less than the reference value, the Q-factor $Q_S$ of the source resonator 131 may be set to less than 100.

The source device 110 wirelessly transmits wake-up power used to wake up the target device 120, and broadcasts a configuration signal used to configure a wireless power transmission network. The source device 110 further receives, from the target device 120, a search frame including a receiving sensitivity of the configuration signal, and may further permit a join of the target device 120. The source device 110 may further transmit, to the target device 120, an ID used to identify the target device 120 in the wireless power transmission network. The source device 110 may further generate the charging power through a power control, and may further wirelessly transmit the charging power to the target device 120.

The target device 120 receives wake-up power from at least one of source devices, and activates a communication function, using the wake-up power. The target device 120 further receives, from at least one of the source devices, a configuration signal used to configure a wireless power transmission network, and may further select the source device 110 based on a receiving sensitivity of the configuration signal. The target device 120 may further wirelessly receive power from the selected source device 110.

Figure 2:
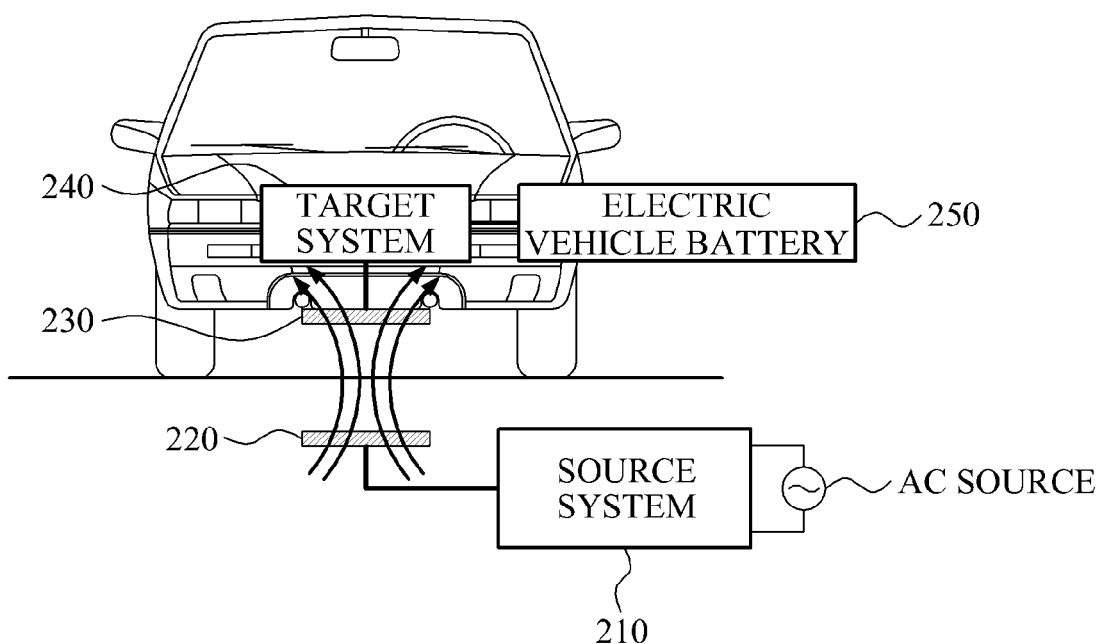
FIG. 2 is a diagram illustrating an example of an electric vehicle charging system.

FIG. 2 illustrates an example of an electric vehicle charging system 200. Referring to FIG. 2, an electric vehicle charging system 200 includes a source system 210, a source resonator 220, a target resonator 230, a target system 240, and an electric vehicle battery 250.

In one example, the electric vehicle charging system 200 includes a structure similar to the structure of the wireless power transmission system of FIG. 1. The source system 210 and the source resonator 220 in the electric vehicle charging system 200 operate as a source. The target resonator 230 and the target system 240 in the electric vehicle charging system 200 operate as a target.

In one example, the source system 210 includes an alternating current-to-direct current (AC/DC) converter, a power detector, a power converter, a control and communication (control/communication) unit similar to those of the source device 110 of FIG. 1. In one example, the target system 240 includes a rectifier, a DC-to-DC (DC/DC) converter, a switch, a charging unit, and a control/communication unit similar to those of the target device 120 of FIG. 1. The electric vehicle battery 250 is charged by the target system 240. The electric vehicle charging system 200 may use a resonant frequency in a band of a few kHz to tens of MHz.

The source system 210 generates power based on a type of the vehicle being charged, a capacity of the electric vehicle battery 250, and a charging state of the electric vehicle battery 250, and wirelessly transmits the generated power to the target system 240 via a magnetic coupling between the source resonator 220 and the target resonator 230.

The source system 210 may control an alignment of the source resonator 220 and the target resonator 230. For example, when the source resonator 220 and the target resonator 230 are not aligned, the controller of the source system 210 may transmit a message to the target system 240 to control the alignment of the source resonator 220 and the target resonator 230.

For example, when the target resonator 230 is not located in a position enabling maximum magnetic coupling, the source resonator 220 and the target resonator 230 are not properly aligned. When a vehicle does not stop at a proper position to accurately align the source resonator 220 and the target resonator 230, the source system 210 may instruct a position of the vehicle to be adjusted to control the source resonator 220 and the target resonator 230 to be aligned. However, this is just an example, and other methods of aligning the source resonator 220 and the target resonator 230 may be used.

The source system 210 and the target system 240 may transmit or receive an ID of a vehicle and exchange various messages by performing communication with each other.

The description of FIG. 1 is also applicable to the electric vehicle charging system 200. However, the electric vehicle charging system 200 may use a resonant frequency in a band of a few kHz to tens of MHz, and may wirelessly transmit power that is equal to or higher than tens of watts to charge the electric vehicle battery 250.

Figure 3:
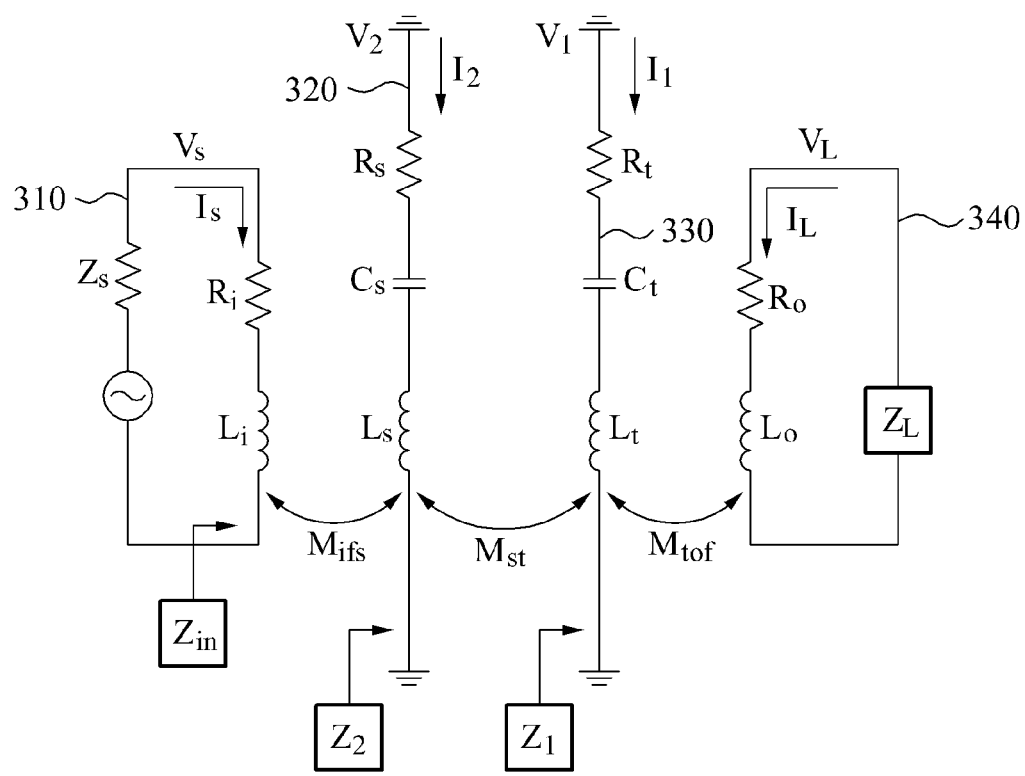
FIG. 3 is a diagram illustrating an example of an equivalent circuit of a wireless power transmission system.

FIG. 3 illustrates an example of an equivalent circuit of a wireless power transmission system. In the wireless power transmission system, a source resonator or a target resonator may correspond to a loop resonator or a spiral resonator.

A distribution of a magnetic field in the loop resonator or the spiral resonator may be non-uniform. According to a distribution of a magnetic field in an internal portion of the loop resonator, a strength of the magnetic field may be relatively strong outside the loop resonator, and the strength of the magnetic field may be relatively weak at a center of the loop resonator. In addition, according to a distribution of a magnetic field in an internal portion of the spiral resonator, a strength of the magnetic field may be relatively strong outside the spiral resonator, and the strength of the magnetic field may be relatively weak at a center of the spiral resonator.

Accordingly, when the source resonator and the target resonator are aligned incorrectly, or when a distance between the source resonator and the target resonator is changed, a coupling coefficient may be changed. In this example, the coupling coefficient may be denoted as "k" or "kappa".

When the coupling coefficient is changed, impedance may be changed. In this example, a reflected wave may be generated due to the change in the impedance.

For example, in a 6.6 kilowatt (kW) electric vehicle charging system, 10% of a reflected power may correspond to 660 watts (W). Accordingly, the change in the coupling coefficient may increase a burden to a system, and a large amount of power may be wasted. In order to prevent damage to the system caused by the reflected power, protection circuits and matching circuits may be requested. Accordingly, there is a need for a method of maintaining a coupling coefficient although a charging state is changed.

Referring to FIG. 3, the wireless power transmission system may be modeled using an equivalent circuit including a feeder 310, a source resonator 320, a target resonator 330, a feeder and load 340 of a target device.

The feeder 310 induces a current in the source resonator 320 to generate a magnetic field.

In the equivalent circuit of FIG. 3, $Z_1$, $Z_2$, and $Z_{in}$, may be expressed by Equations 1 through 3, respectively.

$$V_L = (R_o + j\omega L_o + Z_L)I_L + j\omega M_{tof} I_1 (V_L = 0) \brace V_1 = \left(j\omega L_t + \frac{1}{j\omega C_t} + R_t\right)I_1 + j\omega M_{tof} I_L} \rightarrow$$ [Equation 1]

$$Z_1 \approx R_t + \frac{\omega^2 M_{tof}^2}{R_o + Z_L}$$

$$V_1 = Z_2 I_1 + j\omega M_{st} I_2 (V_1 = 0) \brace V_2 = \left(j\omega L_s + \frac{1}{j\omega C_s} + R_s\right)I_2 + j\omega M_{st} I_1} \rightarrow Z_2 =$$ [Equation 2]

$$R_s + \frac{\omega^2 M_{st}^2}{Z_1}$$

$$V_2 = Z_2 I_2 + j\omega M_{ifs} I_s (V_2 = 0) \brace V_s = (j\omega L_i + R_i)I_s + j\omega M_{ifs} I_2} \rightarrow Z_{in} \approx R_i + \frac{\omega^2 M_{ifs}^2}{Z_2}$$ [Equation 3]

In Equations 1 through 3, $M_{st}$ denotes a mutual inductance between the source resonator 320 and the target resonator 330, $M_{ifs}$ denotes a mutual inductance between the feeder 310 and the source resonator 320, and $M_{tof}$ denotes a mutual inductance between the target resonator 330 and the feeder and load 340 of the target device.

Referring to Equations 1 through 3, $Z_{in}$ may be determined based on a coupling coefficient between the feeder 310 and the source resonator 320, a coupling coefficient between the source resonator 320 and the target resonator 330, and a coupling coefficient between the target resonator 330 and the feeder and load 340 of the target device. When a size of the feeder 310, or a location of the feeder 310 and a location of the feeder and load 340 are fixed, $Z_{in}$ may be determined based on the coupling coefficient between the source resonator 320 and the target resonator 330. Accordingly, when the coupling coefficient between the source resonator 320 and the target resonator 330 is changed, $Z_{in}$ may be changed.

Figure 4:
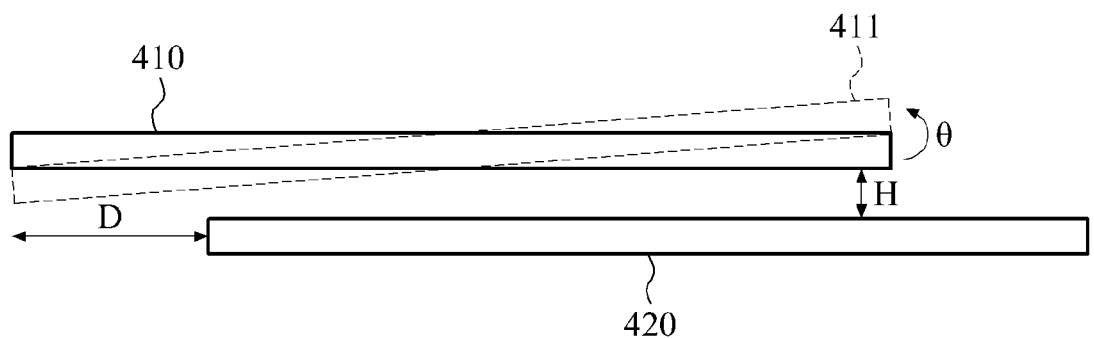
FIG. 4 is a diagram illustrating an example of a misalignment between a source resonator and a target resonator.

FIG. 4 illustrates an example of a misalignment between a source resonator 420 and a target resonator 410. Referring to FIG. 4, the target resonator 410 is aligned above the source resonator 420. For example, the target resonator 410 may correspond to the target resonator 230 of FIG. 2, and the source resonator 420 may correspond to the source resonator 220 of FIG. 2.

As shown in FIG. 4, the target resonator 410 and the source resonator 420 are misaligned in a parallel direction by a distance D. In addition, a distance H between the target resonator 410 and the source resonator 420 may be changed, and an angle θ between the target resonator 410 and the source resonator 420 may be changed. In FIG. 4, a reference numeral 411 denotes the target resonator 410 when a misalignment in a range of the angle θ occurs. In the example of FIG. 4, when the distance D, the distance H, or the angle θ is changed, a value of a coupling coefficient k between the target resonator 410 and the source resonator 420 may be changed.

Figure 5A:
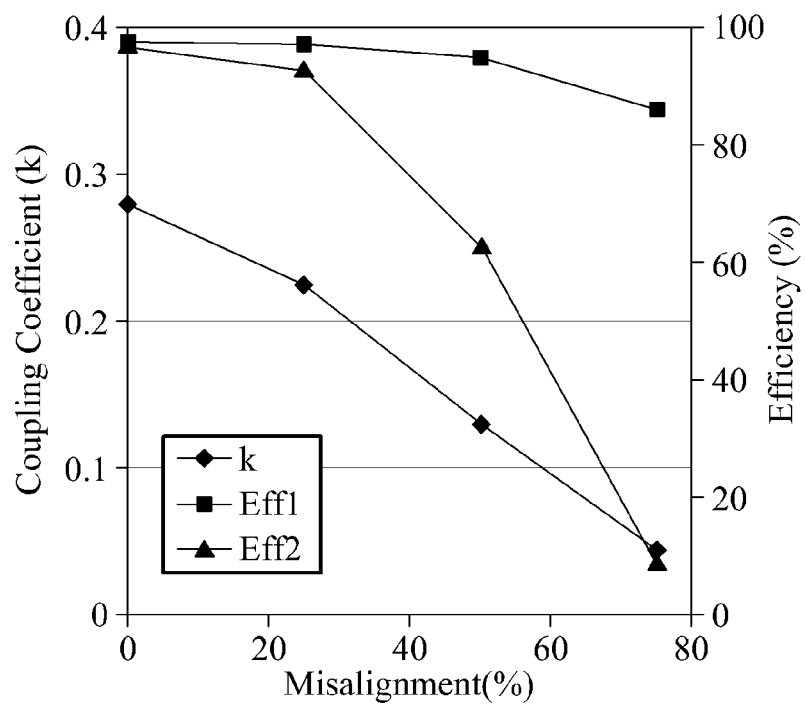
FIGS. 5A and 5B are graphs illustrating examples of various changes caused by the misalignment between the source resonator and the target resonator of FIG. 4.
Figure 5B:
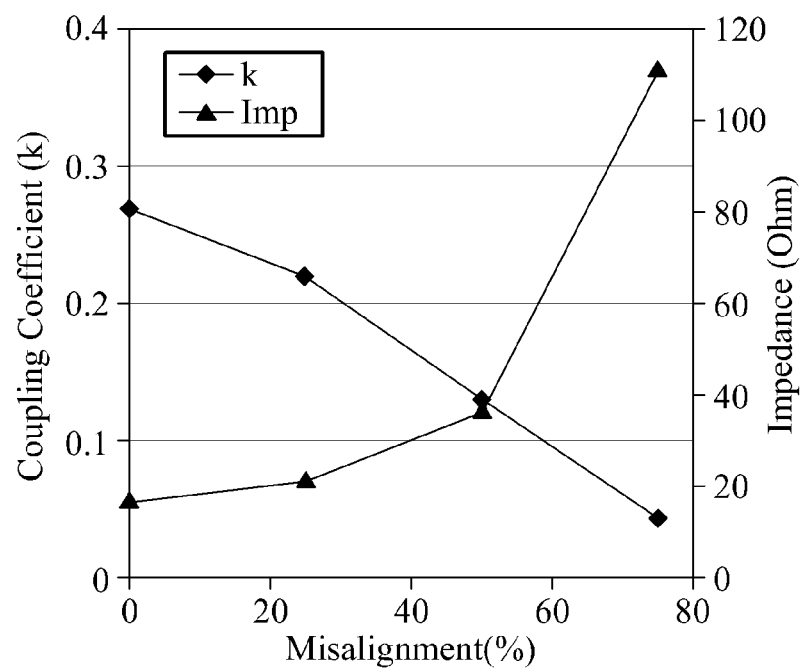

FIGS. 5A and 5B illustrate examples of various changes caused by the misalignment between the source resonator 420 and the target resonator 410 of FIG. 4. A graph of FIG. 5A shows changes to a coupling coefficient and efficiency based on a degree of the misalignment caused by the distance D. The efficiency may refer to an efficiency of wireless power transmission.

In this example, the degree of the misalignment may correspond to an example of expressing a length of the distance D as a percentage when lateral lengths of the target resonator 410 and the source resonator 420 correspond to "100". Eff1 indicates a change in an efficiency when impedance matching is performed based on the misalignment, and Eff2 indicates a change in an efficiency when impedance matching is not performed.

A graph of FIG. 5B shows a change in impedance based on a degree of misalignment. In this example, the impedance may correspond to $Z_{in}$ of FIG. 3.

Referring to FIG. 5A, a high efficiency may be maintained when a value of k changes modestly. When the value of k is changed, an additional matching circuit may be needed to maintain the efficiency. However, the additional matching circuit may increase a complexity of an apparatus, and cause further losses.

Accordingly, there is a need for a method of maintaining the value of k without an additional matching circuit, despite an occurrence of a misalignment. Hereinafter, various examples of a resonant apparatus capable of maintaining the value of k without an additional matching circuit although a misalignment occurs will be described.

The resonant apparatus may adjust or control a distribution of a magnetic field. In addition, the resonant apparatus may enhance or cancel a strength of the magnetic field at a predetermined position.

Accordingly, when a source resonator and a target resonator are misaligned, the resonant apparatus may maintain an amount of coupling formed between the source resonator and the target resonator without an additional device. The amount of the coupling may refer to an amount of a magnetic field passing through the target resonator. The value of the coupling coefficient k may be proportional to the amount of the magnetic field passing through the target resonator.

In this example, the resonant apparatus may include the source resonator 131, the controller 114, and the communication unit 115 of FIG. 1. In addition, the resonant apparatus may include a configuration identical to the configuration of the source device 110 of FIG. 1.

Hereinafter, for ease of description, the configuration of the resonant apparatus will be described based on the configuration of the source device 110. In addition, when examples of the resonant apparatus are described, a description and illustration of a variable SMPS, a power amplifier, a matching network, a controller, a communication unit, and the like may be omitted.

Figure 6:
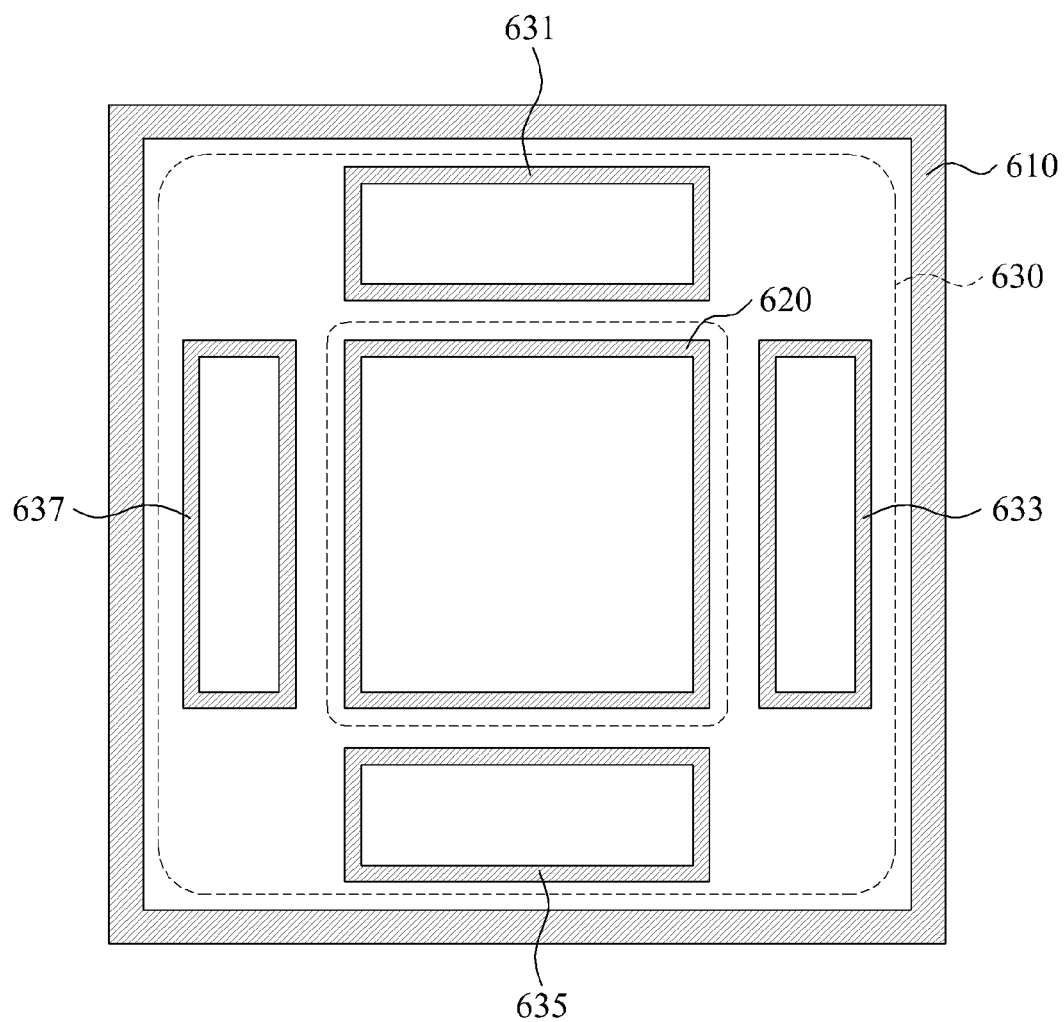
FIG. 6 is a diagram illustrating an example of a configuration of a resonant apparatus.

FIG. 6 illustrates an example of a configuration of a resonant apparatus 600. Referring to FIG. 6, the resonant apparatus 600 includes a main resonant unit 610, a field guiding resonant unit 620, and a field additive resonant unit 630. In this example, the main resonant unit 610, the field guiding resonant unit 620, and the field additive resonant unit 630 may correspond to conductors.

The main resonant unit 610 forms magnetic resonant coupling between the resonant apparatus 600 and a target resonator. Although the main resonant unit 610 is illustrated in a quadrangular form, the main resonant unit 610 may be provided in a form of a loop of various shapes, for example, a circle, a rectangle, and the like. In addition, the main resonant unit 610 may be provided in a spiral structure, or a helical structure, in addition to the form of the loop.

The field guiding resonant unit 620 focuses a magnetic field on an internal portion of the main resonant unit 610. In addition, the field guiding resonant unit 620 controls a distribution of a magnetic field generated by the resonant apparatus 600 to be focused on the internal portion of the main resonant unit 610. As shown in FIG. 6, the field guiding resonant unit 620 is disposed in the internal portion of the main resonant unit 610.

A magnetic field is generated by a current flowing through the main resonant unit 610, and a current may be induced in the field guiding resonant unit 620 by the magnetic field. In this example, the distribution of the magnetic field generated in the internal portion of the main resonant unit 610 may be determined based on a direction of the current flowing through the main resonant unit 610 and a direction of the current flowing through the field guiding resonant unit 620. The direction of the current flowing through the field guiding resonant unit 620 may be determined based on a ratio of a resonant frequency of the field guiding resonant unit 620 to a resonant frequency of the main resonant unit 610.

The resonant frequency of the field guiding resonant unit 620 may be variable based on a control of a controller (not shown). As an example, the field guiding resonant unit 620 may include a variable capacitor. By controlling the variable capacitor, the resonant frequency of the field guiding resonant unit 620 may be changed.

As another example, the field guiding resonant unit 620 may be connected to the controller through at least one coil. By adjusting an inductance of the at least one coil, the resonant frequency of the field guiding resonant unit 620 may be changed.

When the direction of the current flowing through the field guiding resonant unit 620 differs from the direction of the current flowing through the main resonant unit 610, a strength of a magnetic field formed between the field guiding resonant unit 620 and the main resonant unit 610 may increase.

The resonant frequency of the field guiding resonant unit 620 may be greater than or equal to an operating frequency of the resonant apparatus 600. In addition, the resonant frequency of the field guiding resonant unit 620 may be greater than or equal to the resonant frequency of the main resonant unit 610.

The field additive resonant unit 630 adjusts a magnitude of the magnetic field formed between the main resonant unit 610 and the field guiding resonant unit 620. As shown in FIG. 6, the field additive resonant unit 630 is disposed between the main resonant unit 610 and the field guiding resonant unit 620.

The field additive resonant unit 630 includes a plurality of sub-resonant units 631, 633, 635, and 637. In this example, the plurality of sub-resonant units 631, 633, 635, and 637 may be turned ON and OFF based on the control of the controller. The plurality of sub-resonant units 631, 633, 635, and 637 may be turned ON and OFF separately based on the control of the controller. For example, when the first sub-resonant unit 631 and the second sub-resonant unit 633 are turned ON, the third sub-resonant unit 635 and the fourth sub-resonant unit 637 may be turned OFF.

In this example, the controller may detect a misalignment between the main resonant unit 610 and the target resonator, and control an entirety or a portion of the plurality of sub-resonant units 631, 633, 635, and 637 to be turned ON or OFF, based on a state of the misalignment. In this example, "the sub-resonant units turned ON or OFF" may indicate the sub-resonant units activated or deactivated.

Each of the plurality of sub-resonant units 631, 633, 635, and 637 may include a capacitor, and a switch connected in parallel to the capacitor. An ON or OFF state of a switch may be a concept divergent from an ON or OFF state of a sub-resonant unit. For example, when a switch connected in parallel to a capacitor is turned ON, a corresponding sub-resonant unit may be deactivated. When the switch connected in parallel to the capacitor is turned OFF, the corresponding sub-resonant unit may be activated.

Figure 17:
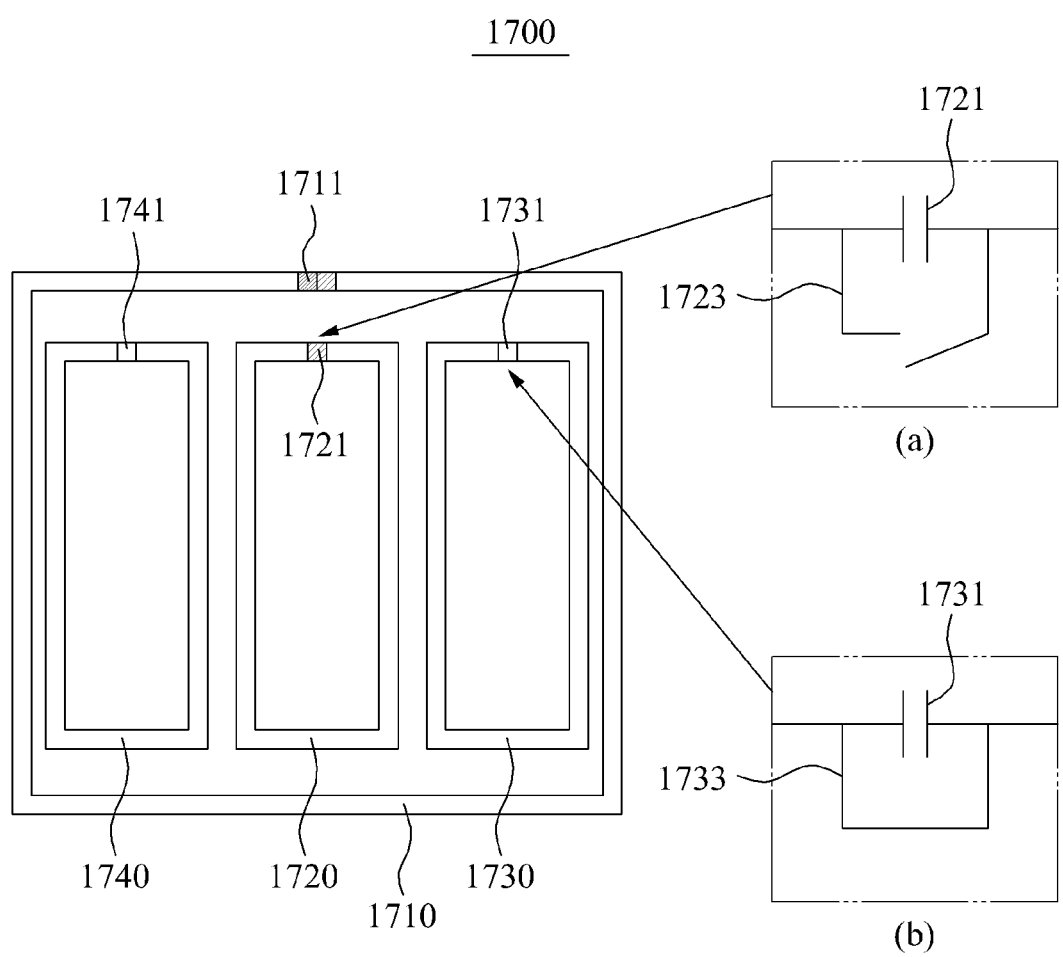
FIG. 17 is a diagram illustrating still another example of a configuration of a resonant apparatus.

For example, a switch to be used to turn a sub-resonant unit ON is connected in parallel to a capacitor, as shown in parts (a) and (b) of FIG. 17. In this example, when the switch is turned ON, the sub-resonant unit may be deactivated. When the switch is turned ON while the switch is connected in parallel to the capacitor, a capacitance component may almost disappear, and a resonance may not occur. Accordingly, the sub-resonant unit may be deactivated.

The controller may detect a portion of the resonant apparatus 600 that needs an enhancement of the magnetic field, based the state of the misalignment, and control a switch of a sub-resonant unit disposed in the portion needing the enhancement of the magnetic field to be turned OFF. The controller may detect a portion of the resonant apparatus 600 that needs a cancellation of the magnetic field, based on the state of the misalignment, and control a switch of a sub-resonant unit disposed in the portion needing the cancellation of the magnetic field to be turned ON.

An example of controlling the plurality of sub-resonant units 631, 633, 635, and 637 to be turned ON or OFF based on the state of the misalignment will be described in detail with reference to FIGS. 11 and 12.

The controller may receive state information from a wireless power receiver, and determine an amount of power to be transmitted and whether the plurality of sub-resonant units is to be turned ON or OFF, based on the state information. The state information received from the wireless power receiver may include information of an amount of current or power received by the wireless power receiver through the magnetic resonant coupling. The controller may determine, based on the information of the amount of the current or power received through the magnetic resonant coupling, a number of sub-resonant units to be turned ON, a number of sub-resonant units to be turned OFF, and/or an increment in an amount of current to be supplied to a source resonator.

Figure 7A:
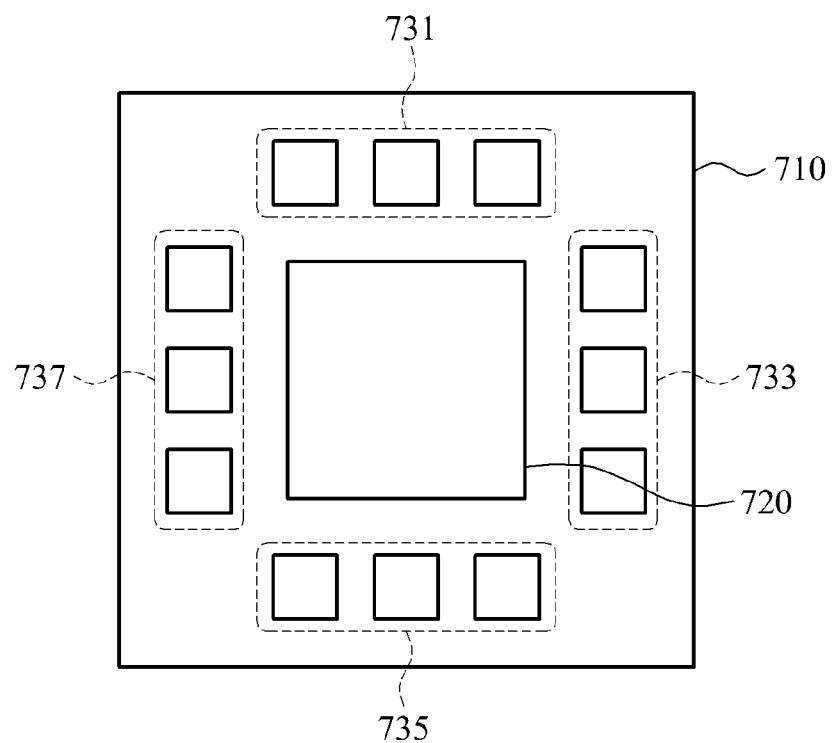
FIGS. 7A and 7B are diagrams illustrating other examples of a configuration of a resonant apparatus.
Figure 7B:
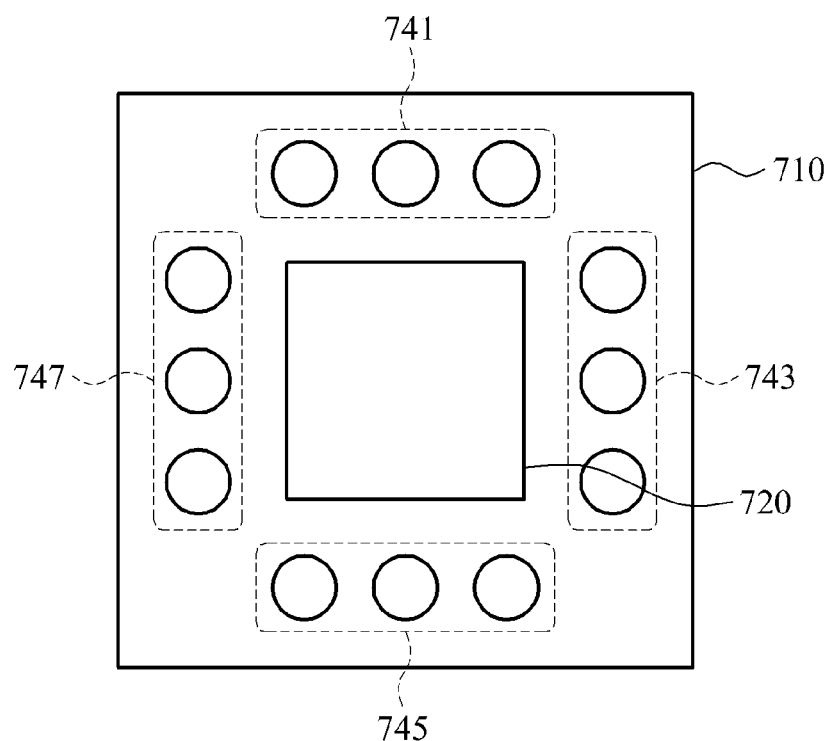

FIGS. 7A and 7B illustrate other examples of a configuration of a resonant apparatus. In FIGS. 7A and 7B, an example of a sub-resonant unit including a plurality of sub-sub-resonant units is illustrated.

In FIG. 7A, each of the plurality of sub-sub-resonant units are provided in a rectangular form. In FIG. 7B, each of the plurality of sub-sub-resonant units are provided in a circular form.

Referring to FIGS. 7A and 7B, the resonant apparatus includes a main resonant unit 710 and a field guiding resonant unit 720. The resonant apparatus of FIG. 7A further includes sub-resonant units 731, 733, 735, and 737, each including a plurality of sub-sub-resonant units in a rectangular form. The resonant apparatus of FIG. 7B further includes sub-resonant units 741, 743, 745, and 747, each including a plurality of sub-sub-resonant units in a circular form.

In this example, the plurality of sub-sub-resonant units may be turned ON and OFF separately based on a control of a controller (not shown), similar to the sub-resonant units. For example, one of three sub-sub-resonant units included in the sub-resonant unit 731 may be turned OFF. In addition, all of three sub-sub-resonant units included in the sub-resonant unit 733 may be turned ON while one of the three sub-sub-resonant units included in the sub-resonant unit 731 is turned ON, and one of three sub-sub-resonant units included in the sub-resonant unit 735 is turned ON. Accordingly, the sub-resonant units of FIGS. 7A and 7B may enable more precise field addition, when compared to the sub-resonant units of FIG. 6.

Figure 8:
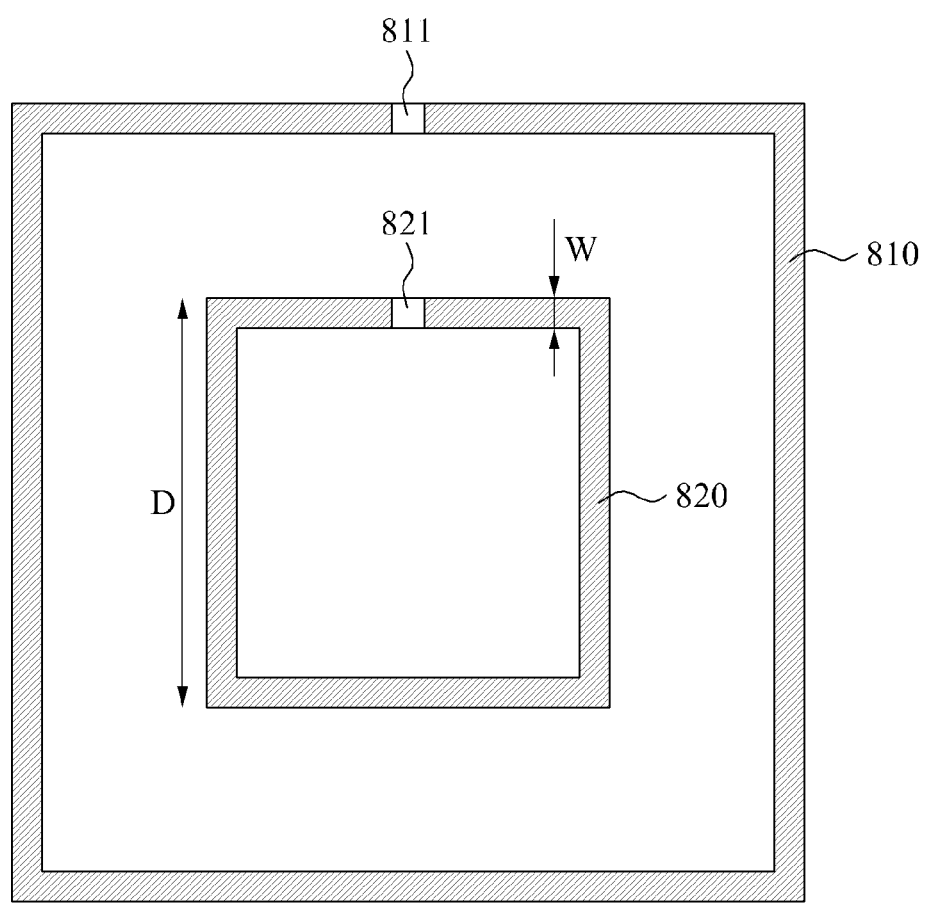
FIG. 8 is a diagram illustrating an example of operations of a main resonant unit and a field guiding resonant unit.

FIG. 8 illustrates an example of operations of a main resonant unit 810 and a field guiding resonant unit 820. As shown in FIG. 8, a first capacitor 811 is inserted in series in a middle area of the main resonant unit 810. An electric field may be confined to be within the first capacitor 811.

In this example, the first capacitor 811 may have a shape corresponding to a lumped element, a divided element, and the like. For example, a divided capacitor having the shape of the divided element may include zigzagged conductor lines and a dielectric material having a high permittivity between the zigzagged conductor lines.

In response to the first capacitor 811 being inserted into a transmission line, the main resonant unit 810 may have a characteristic of a metamaterial. The metamaterial may indicate a material having a predetermined electrical property that has not been discovered in nature, and thus, the metamaterial may have an artificially designed structure. An electromagnetic characteristic of materials existing in nature may have a unique magnetic permeability or a unique permittivity. Most materials may have a positive magnetic permeability or a positive permittivity.

In the example of most materials, a right hand rule may be applied to an electric field, a magnetic field, and a pointing vector, and thus, the corresponding materials having the right hand rule applied may be referred to as right handed materials (RHMs). As another aspect, the metamaterial having a magnetic permeability or a permittivity absent in nature may be classified into an epsilon negative (ENG) material, an MNG material, a DNG material, a negative refractive index (NRI) material, a left-handed (LH) material, and the like. The classification may be based on a sign of the corresponding permittivity or magnetic permeability.

In response to a capacitance of the first capacitor 811 inserted as the lumped element being appropriately determined, the main resonant unit 810 may have the characteristic of the metamaterial. The main resonant unit 810 may have a negative magnetic permeability based on an adjustment of the capacitance of the first capacitor 811. Thus, the main resonant unit 810 may also be referred to as an MNG resonator.

Various criteria may be used to determine the capacitance of the first capacitor 811. For example, the various criteria may include a criterion for enabling the main resonant unit 810 to have the characteristic of the metamaterial, a criterion for enabling the main resonant unit 810 to have a negative magnetic permeability in a target frequency, a criterion for enabling the main resonant unit 810 to have a zeroth order resonance characteristic in the target frequency, and the like. Based on any combination of the aforementioned criteria, the capacitance of the first capacitor 811 may be determined.

The main resonant unit 810, also referred to as the MNG resonator, may have a zeroth order resonance characteristic. The zeroth order resonance characteristic may have, as a resonance frequency, a frequency where a propagation constant is "0". Because the main resonant unit 810 may have the zeroth order resonance characteristic, the resonance frequency may be independent of a physical size of the MNG resonator.

The MNG resonator may change the resonance frequency based on an appropriate design of the first capacitor 811. Accordingly, the physical size of the MNG resonator may not be changed.

In a near field, the electric field may be concentrated on the first capacitor 811 inserted into the transmission line. Accordingly, due to the first capacitor 811, the magnetic field may become dominant in the near field.

The MNG resonator may have a relatively high Q-factor using the first capacitor 811 of the lumped element and thus, an enhancement of an efficiency of power transmission may be possible. For example, the Q-factor may indicate a level of an ohmic loss or a ratio of a reactance with respect to a resistance in the wireless power transmission. The efficiency of the wireless power transmission may increase corresponding to an increase in the Q-factor.

Although not illustrated in FIG. 8, a magnetic core may be provided to pass through the MNG resonator. The magnetic core may increase a power transmission distance.

Referring to FIG. 8, the field guiding resonant unit 820 includes a second capacitor 821. A resonant frequency of the field guiding resonant unit 820 may be determined based on a capacitance of the second capacitor 821, a width W of a transmission line, and a length D of the transmission line.

By adjusting the resonant frequency of the field guiding resonant unit 820, a distribution of a magnetic field in an internal portion of the main resonant unit 810 may be adjusted. For example, a controller (not shown) may adjust the resonant frequency of the field guiding resonant unit 820 to be greater than a resonant frequency of the main resonant unit 810, or adjust the resonant frequency of the field guiding resonant unit 820 to be less than the resonant frequency of the main resonant unit 810. In addition, the controller may control the resonant frequency of the field guiding resonant unit 820 for a strength of a magnetic field formed in the center of the main resonant unit 810 to be similar to a magnetic field formed outside the main resonant unit 810.

Figure 9:
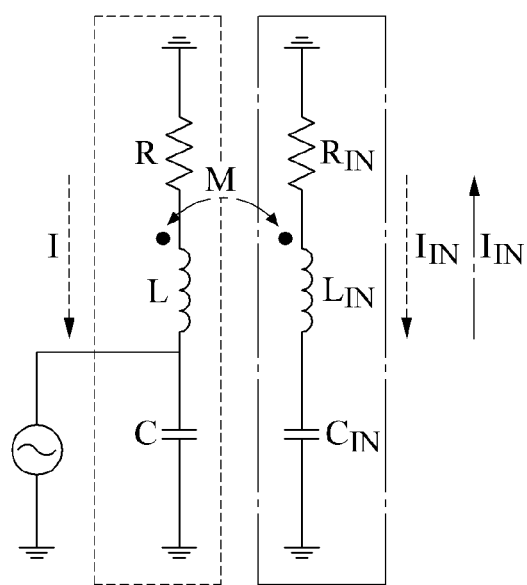
FIG. 9 is a diagram illustrating an example of equivalent circuits of the main resonant unit and the field guiding resonant unit of FIG. 8.

FIG. 9 illustrates an example of equivalent circuits of the main resonant unit 810 and the field guiding resonant unit 820 of FIG. 8. Referring to FIG. 9, the main resonant unit 810 and the field guiding resonant unit 820 are expressed by RLC resonant circuits. In general, a resonant frequency may be calculated, as expressed by Equation 4.

$$f_0 = \frac{1}{2\pi\sqrt{LC}} \qquad \text{[Equation 4]}$$

Referring to Equation 4, a resistor component may have no effect on the resonant frequency to be determined. A resistor component of the field guiding resonant unit 820 may have no effect on a direction of a current flowing through the field guiding resonant unit 820 and a resonant frequency of the field guiding resonant unit 820.

The resonant component may affect a Q value of the field guiding resonant unit 820 and an efficiency of wireless power transmission. Accordingly, although the equivalent circuit is interpreted while a resistor component is set to "0" on the equivalent circuit, the resistor component may have no effect on determination of the direction of the current flowing through the field guiding resonant unit 820 and the resonant frequency of the field guiding resonant unit 820.

When a current is supplied to the main resonant unit 810, a magnetic field may be generated, and a current may flow through the field guiding resonant unit 820 through a mutual inductance M. When the resistor component of the equivalent circuit is ignored, a relational expression at the field guiding resonant unit 820 may be derived, as expressed by Equation 5.

$$\left(j\omega L_{IN} + \frac{1}{j\omega C_{IN}}\right)I_{IN} + j\omega MLI = 0 \quad \text{[Equation 5]}$$

In Equation 5, $L_{IN}$ and $C_{IN}$ denote an inductance and a capacitance of the field guiding resonant unit 820, respectively. M denotes a mutual inductance between the main resonant unit 810 and the field guiding resonant unit 820. I denotes a current component flowing through the main resonant unit 810, and $I_{IN}$ denotes a current component flowing through the field guiding resonant unit 820.

$I_{IN}$ may be expressed by Equation 6.

$$I_{IN} = \frac{-j\omega\sqrt{LL_{IN}}\,\kappa}{j\omega L_{IN} + \frac{1}{j\omega C_{IN}}}I = \frac{\sqrt{LL_{IN}}\,\kappa}{\left(\frac{f_{IN0}}{f_o}\right) - 1}I \quad \text{[Equation 6]}$$

$$\kappa = \frac{M}{\sqrt{LL_{IN}}}$$

When the current component I flowing through the main resonant unit 810 is greater than "0", a direction of the current $I_{IN}$ flowing through the field guiding resonant unit 820 may be determined based on a ratio of the resonant frequency $f_{IN0}$ of the field guiding resonant unit 820 to the resonant frequency $f_0$ of the main resonant unit 810. For example, when the resonant frequency $f_{IN0}$ of the field guiding resonant unit 820 is greater than the resonant frequency $f_0$ of the main resonant unit 810, a direction of the current $I_{IN}$ flowing through the field guiding resonant unit 820 may be identical to a direction of the current I flowing through the main resonant unit 810.

Conversely, when the resonant frequency $f_{IN0}$ of the field guiding resonant unit 820 is less than the resonant frequency $f_0$ of the main resonant unit 810, the direction of the current $I_{IN}$ flowing through the field guiding resonant unit 820 may be opposite to the direction of the current I flowing through the main resonant unit 810. k denotes a value kappa, which is a factor used to determine the efficiency of wireless power transmission.

As described above, when the resonant frequency $f_{IN0}$ of the field guiding resonant unit 820 is greater than the resonant frequency $f_0$ of the main resonant unit 810, the direction of the current $I_{IN}$ may be identical to the direction of the current I. Accordingly, a strength of a magnetic field formed in the internal portion of the field guiding resonant unit 820 may increase, and a strength of a magnetic field formed outside the field guiding resonant unit 820 may decrease.

When the resonant frequency $f_{IN0}$ of the field guiding resonant unit 820 is less than the resonant frequency $f_0$ of the main resonant unit 810, the direction of the current $I_{IN}$ may be opposite to the direction of the current I. Accordingly, the strength of the magnetic field formed in the internal portion of the field guiding resonant unit 820 may decrease, and the strength of the magnetic field formed outside the field guiding resonant unit 820 may increase.

When the resonant frequency $f_{IN0}$ of the field guiding resonant unit 820 is equal to the resonant frequency $f_0$ of the main resonant unit 810, the magnetic field may be concentrated on the center of the field guiding resonant unit 820. The resonant frequency $f_0$ of the main resonant unit 810 may correspond to, for example, 13.56 MHz or be in a range of a few MHz to tens of MHz.

Figure 10:
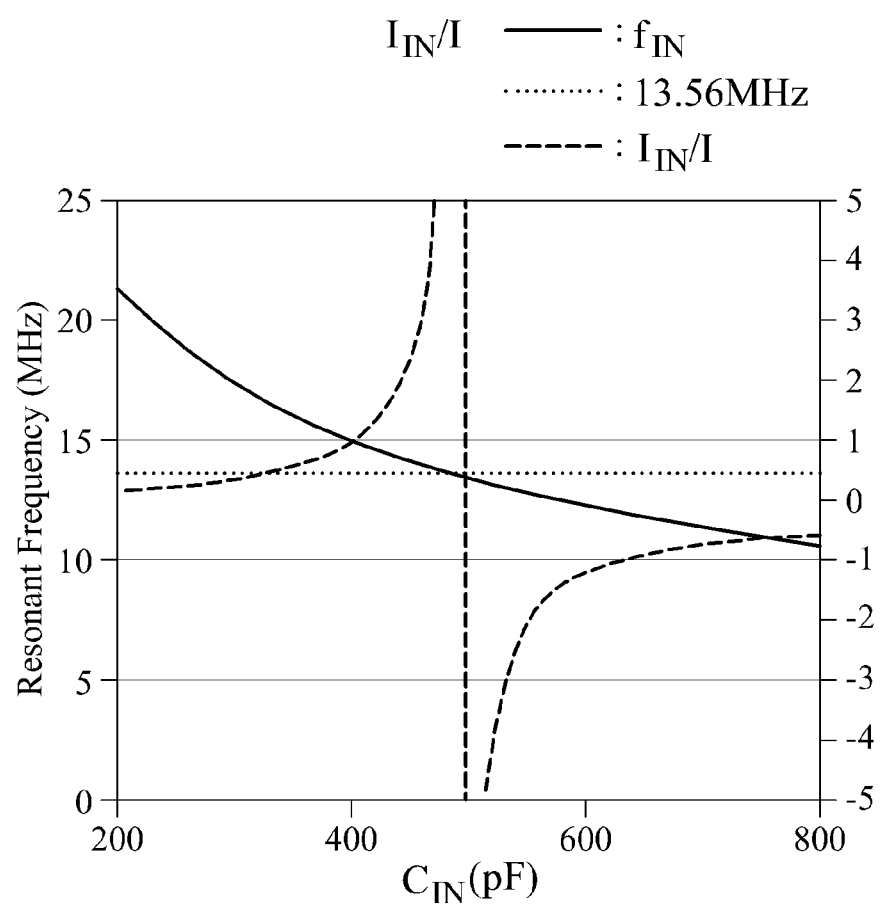
FIG. 10 is a graph illustrating an example of a property of a magnetic field changed based on a resonant frequency of a field guiding resonant unit.

FIG. 10 illustrates an example of a property of a magnetic field changed based on a resonant frequency of a field guiding resonant unit. Referring to FIGS. 9 and 10, in theory, a current $I_{IN}$ may correspond to an infinite value when a resonant frequency of the field guiding resonant unit is equal to a resonant frequency of a main resonant unit.

In FIG. 10, a change in the property of the magnetic field when an operating frequency of a wireless power transmission system corresponds to 13.56 MHz is illustrated. As shown in FIG. 10, when the resonant frequency of the field guiding resonant unit is greater than the operating frequency of the wireless power transmission system, a strength of a magnetic field formed in an internal portion of the field guiding resonant unit may increase. When the resonant frequency of the field guiding resonant unit is less than the operating frequency of the wireless power transmission system, the strength of the magnetic field formed in the internal portion of the field guiding resonant unit may decrease.

Figure 11:
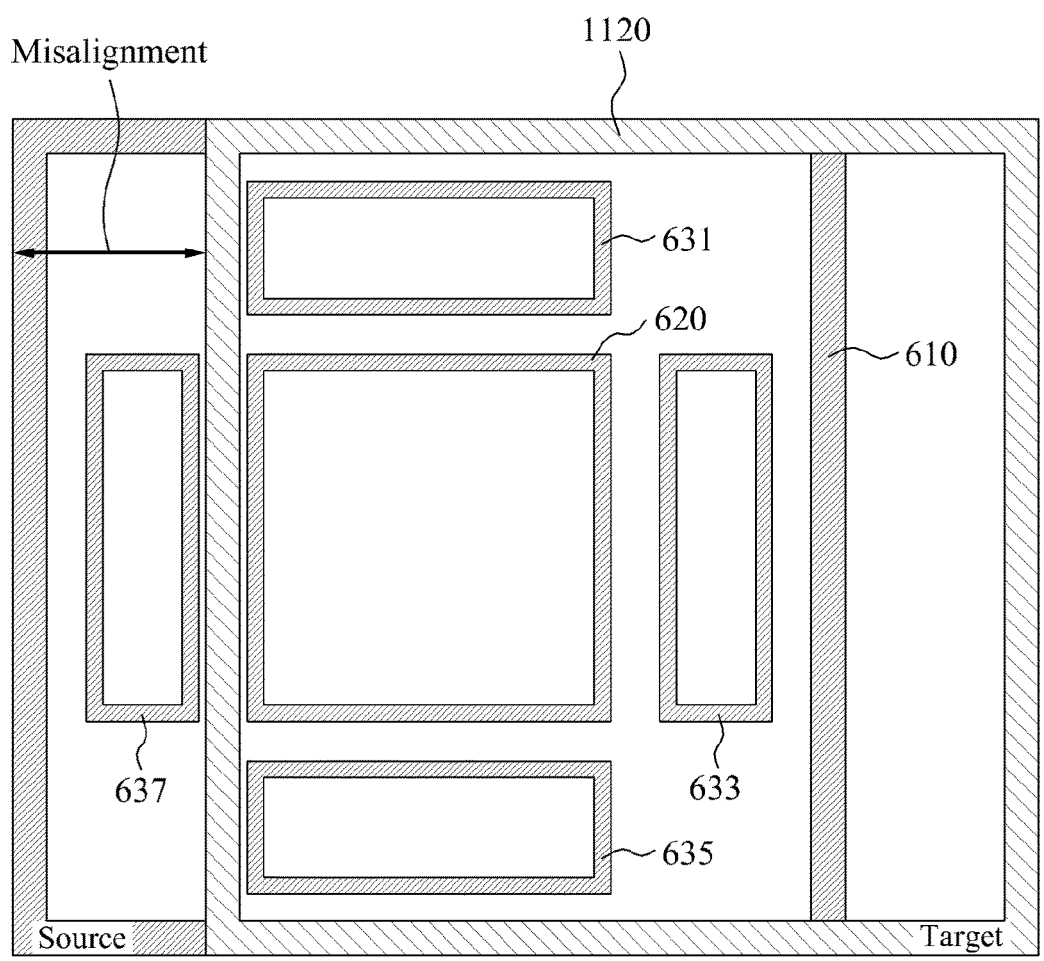
FIGS. 11 and 12 are diagrams illustrating examples of an operation of a resonant apparatus.
Figure 12:
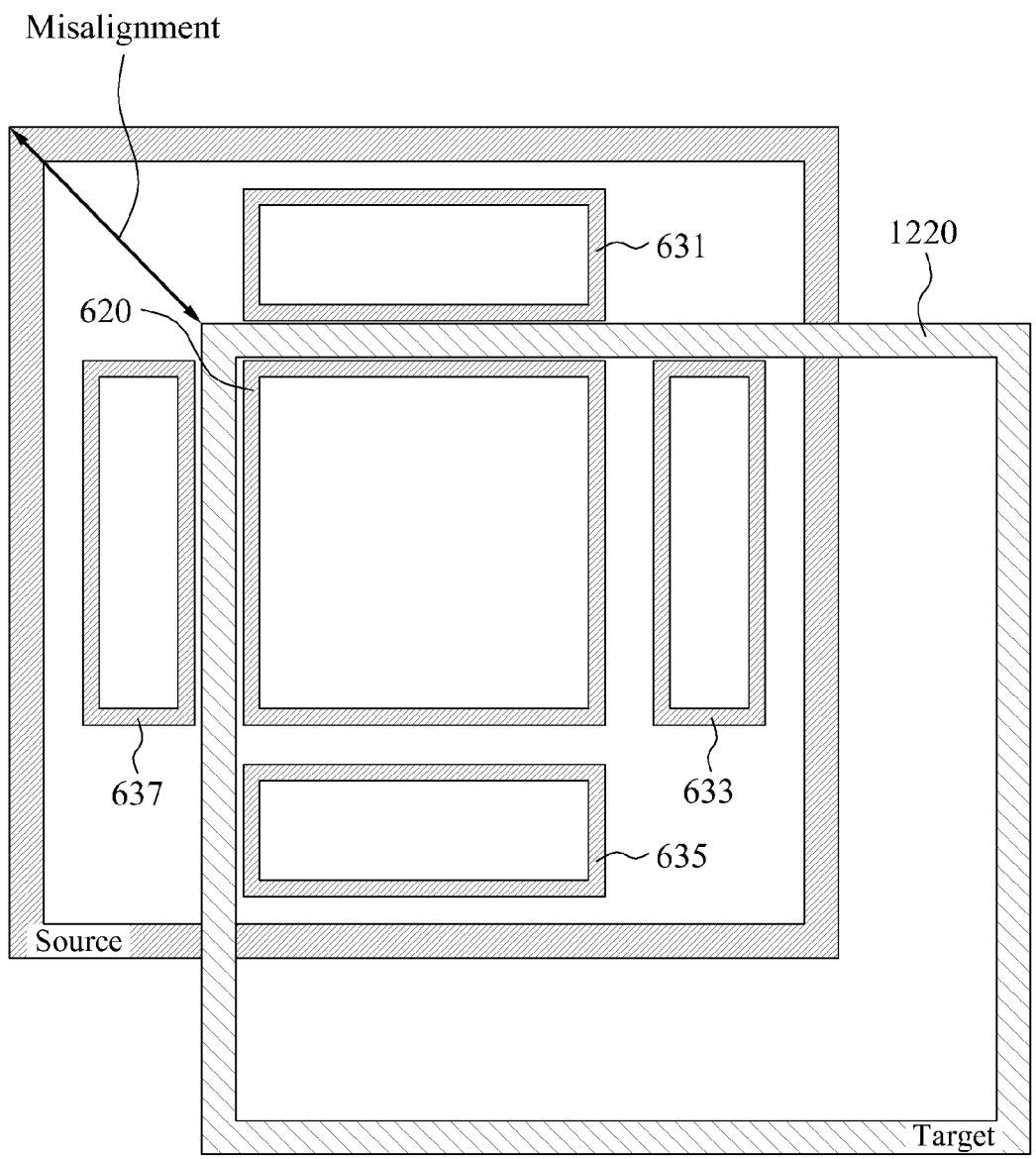

FIGS. 11 and 12 illustrate examples of an operation of a resonant apparatus. In FIG. 11, an example of the resonant apparatus 600 of FIG. 6 and a target resonator 1120 being misaligned in a lateral direction is illustrated. In this example, in order to maintain an amount of coupling formed between the resonant apparatus 600 and the target resonator 1120 to be similar to an amount of coupling for an example in which a misalignment does not occur, each of the sub-resonant units 631, 633, 635, and 637 may be turned ON and OFF properly.

A controller (not shown) may control switches included in the sub-resonant units 631, 633, 635, and 637, respectively, to turn the sub-resonant units 631, 633, 635, and 637ON or OFF. For example, the first sub-resonant unit 631, the second sub-resonant unit 633, and the third sub-resonant unit 635 may be turned ON, and the fourth sub-resonant unit 637 may be turned OFF.

In FIG. 12, an example of the resonant apparatus 600 of FIG. 6 and a target resonator 1220 being misaligned in a diagonal direction is illustrated. In this example, in order to maintain an amount of coupling formed between the resonant apparatus 600 and the target resonator 1220 to be similar to an amount of coupling for an example in which a misalignment does not occur, each of the sub-resonant units 631, 633, 635, and 637 may be turned ON and OFF properly.

For example, the first sub-resonant unit 631 and the fourth sub-resonant unit 637 may be turned OFF, and the second sub-resonant unit 633 and the third sub-resonant unit 635 may be turned ON. In this example, the resonant apparatus 600 may increase an amount of current to be supplied to a power amplifier to increase an amount of power to be transmitted.

As shown in FIGS. 11 and 12, the resonant apparatus 600 may turn ON a sub-resonant unit disposed in a portion in which the resonant apparatus 600 overlaps the target resonator 1120 or 1220, and turn OFF a sub-resonant unit disposed in a portion in which the resonant apparatus 600 does not overlap the target resonator 1120 or 1220. Accordingly, the resonant apparatus 600 may maintain an amount of coupling without a separate matching circuit or protection circuit although the resonant apparatus 600 and the target resonator 1120 or 1220 are misaligned.

The controller may receive state information from a wireless power receiver, periodically, thereby monitoring an environment of the wireless power transmission. For example, the state information may include information of an efficiency of power transmission. The efficiency of power transmission may be calculated based on a ratio of an amount of received power to an amount of transmitted power. When the efficiency of power transmission decreases, the controller may determine that a misalignment occurs. When the misalignment occurs, the controller may control the plurality of sub-resonant units 631, 633, 635, and 637 to be turned ON or OFF, receive the state information again, and maintain an amount of the coupling.

For example, the controller may turn the first sub-resonant unit 6310N, receive first state information, and verify an efficiency of power transmission. In addition, the controller may turn ON the first sub-resonant unit 631 and the second sub-resonant unit 633, receive second state information, and verify an efficiency of power transmission. Further, the controller may turn ON the first sub-resonant unit 631, the second sub-resonant unit 633, and the third sub-resonant unit 635, turn the fourth sub-resonant unit 637 OFF, receive third state information, and verify an efficiency of power transmission.

In the example of FIG. 11, the efficiency of power transmission may be at a maximum when the third state information is received. Accordingly, the controller may maintain the first sub-resonant unit 631, the second sub-resonant unit 633, and the third sub-resonant unit 635 to be turned ON, and the fourth sub-resonant unit 637 to be turned OFF.

As described above, the detection of the misalignment may be verified using various schemes. For example, the controller may determine that the misalignment occurs when a reflected wave increases, or may verify a state of the misalignment using a predetermined sensor.

Figure 13:
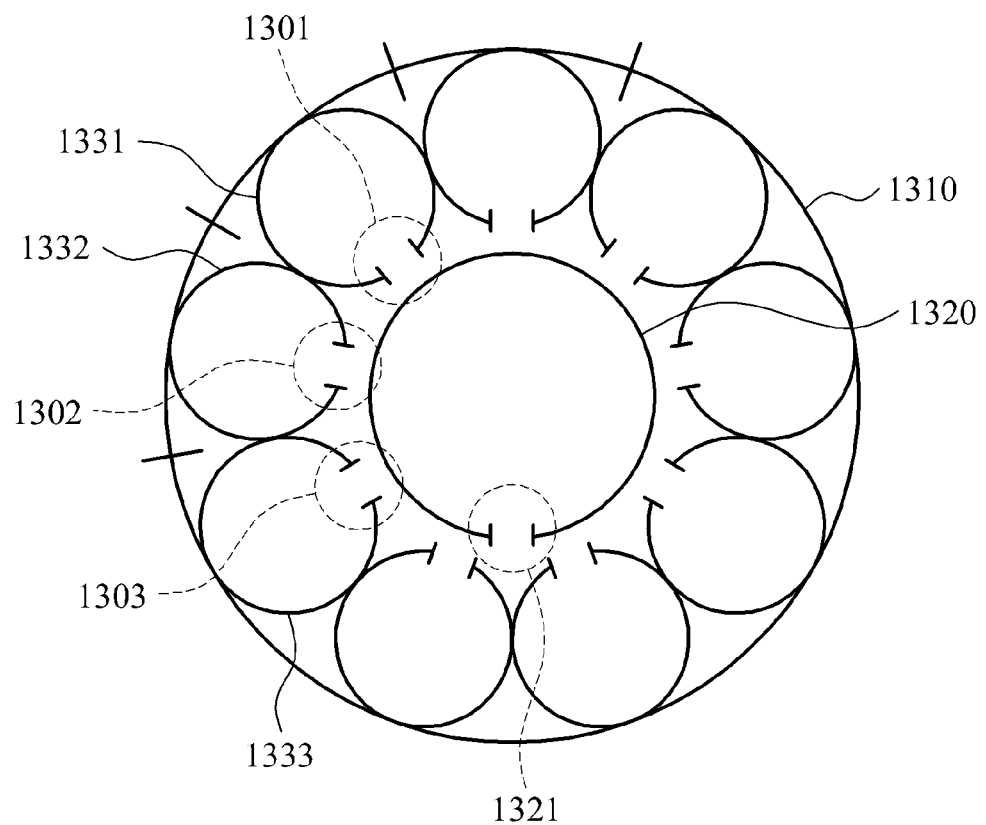
FIGS. 13 through 16 are diagrams illustrating various examples of a resonant apparatus.

FIGS. 13 through 16 illustrate various examples of a resonant apparatus. Referring to FIG. 13, a main resonant unit 1310 of a resonant apparatus 1300 is provided in a circular loop structure.

A field guiding resonant unit 1320 of the resonant apparatus 1300 is provided in a circular loop structure in which a capacitor 1321 is included in the middle of the field guiding resonant unit 1320. The field guiding resonant unit 1320 may be removed as necessary.

In addition, the resonant apparatus 1300 includes a plurality of unit cell resonant units 1331, 1332, and 1333. The plurality of unit cell resonant units 1331, 1332, and 1333 includes capacitors 1301, 1302, and 1303, respectively.

The plurality of unit cell resonant units 1331, 1332, and 1333 may perform a function identical to the function of the sub-resonant units 631, 633, 635, and 637 of FIG. 6. For example, each of the plurality of unit cell resonant units 1331, 1332, and 1333 may be turned ON and OFF separately. Accordingly, the plurality of unit cell resonant units 1331, 1332, and 1333 may act as a field additive resonant unit. As shown in FIG. 13, the field additive resonant unit includes a plurality of circular loop conductors connected to the main resonant unit 1310.

Figure 14:
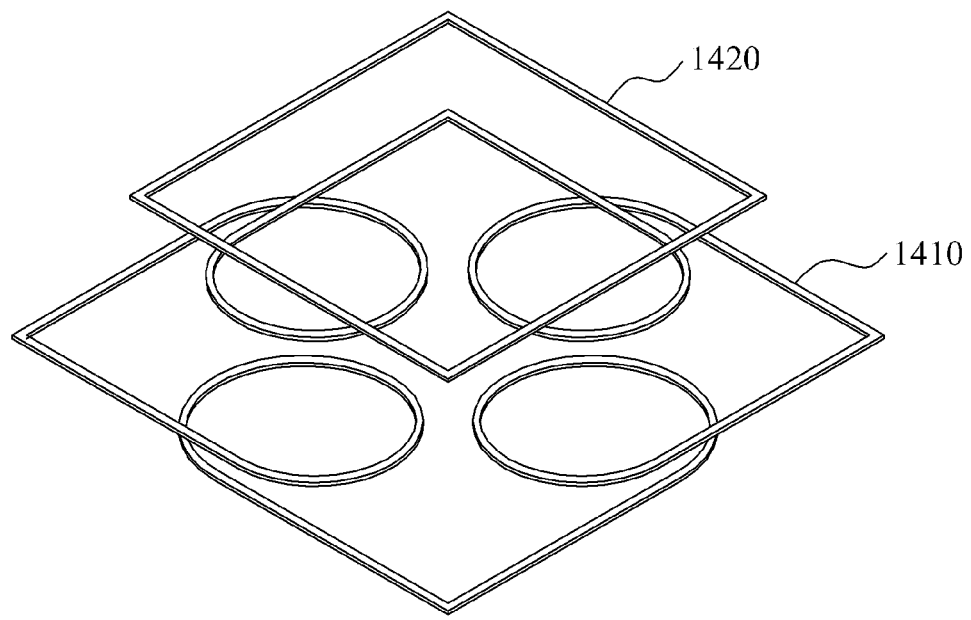

FIG. 14 illustrates another example of a resonant apparatus 1400 including a field additive resonant unit including a plurality of circular loop conductors connected to a main resonant unit 1410. In FIG. 14, a numeral reference 1420 denotes a target resonator.

Figure 15A:
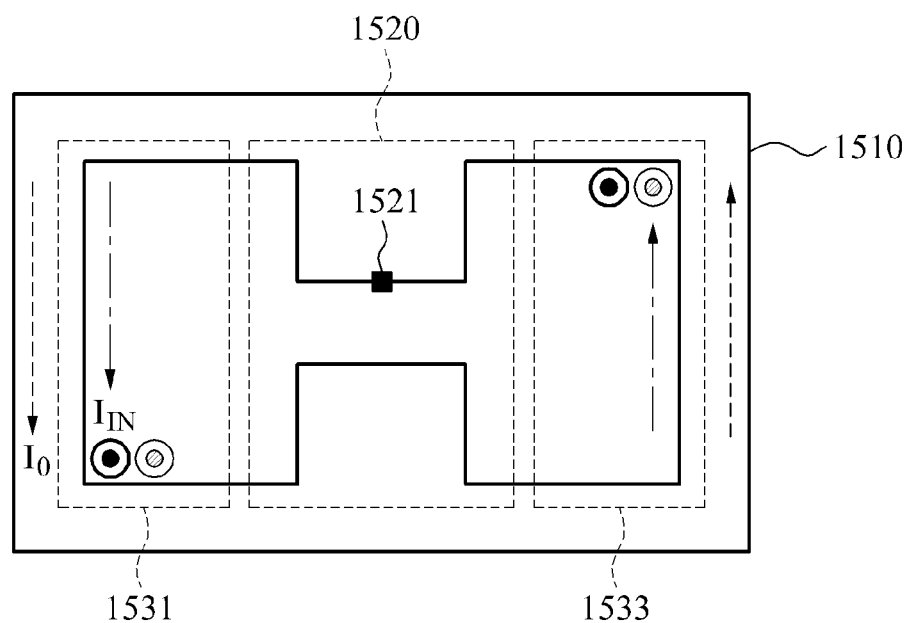
Figure 15B:
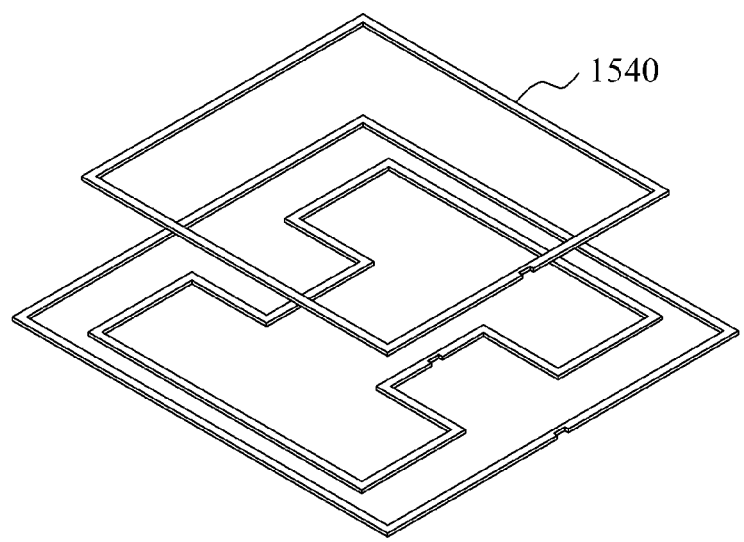

Referring to FIGS. 15A and 15B, a field guiding resonant unit 1520 and field additive resonant units 1531 and 1533 are configured integrally.

FIG. 15A illustrates a configuration of a resonant unit, and FIG. 15B illustrates an alignment between the resonant apparatus and a target resonator 1540. In this example, a size of a main resonant unit 1510 may be greater than a size of the target resonator 1540.

The field guiding resonant unit 1520 and the field additive resonant units 1531 and 1533 are provided in a loop structure in which ends of the field guiding resonant unit 1520 are connected to ends of the field additive resonant units 1531 and 1533. In this example, a width of the field guiding resonant unit 1520 are narrower than widths of the field additive resonant units 1531 and 1533. Although a misalignment occurs in a left or right direction, an amount of a magnetic field transferred to the target resonator 1540 may be maintained due to a shape of the field guiding resonant unit 1520 shown in FIGS. 15A and 15B.

The field guiding resonant unit 1520 includes a capacitor 1521. Although not shown explicitly in FIGS. 15A and 15B, the main resonant unit 1510 may also include a capacitor.

Figure 16:
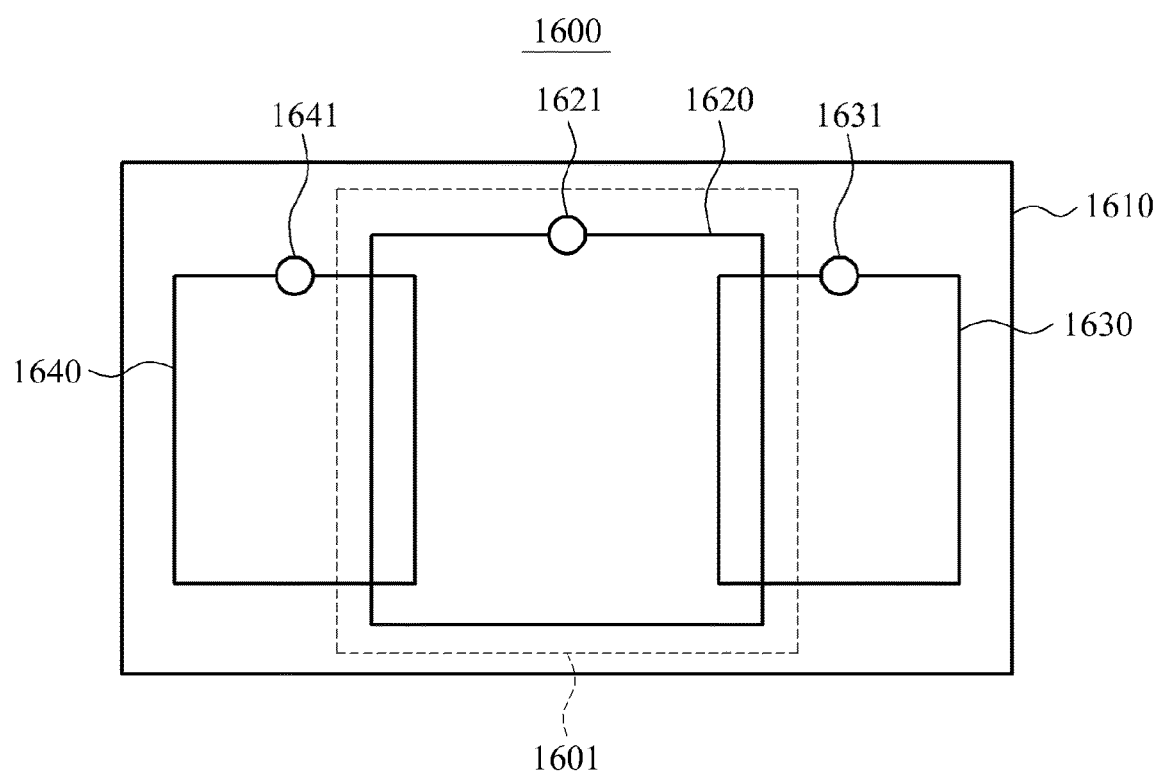

FIG. 16 illustrates still another example of a resonant apparatus 1600. Referring to FIG. 16, the resonant apparatus 1600 includes a field guiding resonant unit 1620 in an internal portion of a main resonant unit 1610. In this example, a size of the field guiding resonant unit 1620 may be similar to a size of a target resonator 1601 marked with a dotted line. The field guiding resonant unit 1620 includes a capacitor 1621 in the middle of the field guiding resonant unit 1620.

For example, when the target resonator 1601 is aligned on a right side, a first sub-resonant unit 1630 may be turned ON, and a second sub-resonant unit 1640 may be turned OFF.

The first sub-resonant unit 1630 includes a first capacitor unit 1631, and the second sub-resonant unit 1640 includes a second capacitor unit 1641.

The first capacitor unit 1631 may include a capacitor and a switch connected in parallel to the capacitor. When the switch of the first capacitor unit 1631 is turned ON, the first sub-resonant unit 1630 may be turned OFF. When the switch of the first capacitor unit 1631 is turned OFF, the first sub-resonant unit 1630 may be turned ON.

The second capacitor unit 1641 may include a capacitor and a switch connected in parallel to the capacitor. When the switch of the second capacitor unit 1641 is turned ON, the second sub-resonant unit 1640 may be turned OFF. When the switch of the second capacitor unit 1641 is turned OFF, the second sub-resonant unit 1640 may be turned ON.

FIG. 17 illustrates still another example of a configuration of a resonant apparatus 1700. Referring to FIG. 17, the resonant apparatus 1700 includes a main resonant unit 1710 including a capacitor 1711, a field guiding resonant unit 1720 including a capacitor 1721, and a plurality of field additive resonant units 1730 and 1740 including capacitors 1731 and 1741, respectively.

As shown in the part (a) of FIG. 17, the field guiding resonant unit 1720 includes a switch 1723 connected in parallel to the capacitor 1721. The part (a) of FIG. 17 illustrates an example in which the switch 1723 is turned OFF such that the field guiding resonant unit 1720 is activated.

As shown in the part (b) of FIG. 17, the field additive resonant unit 1730 may include a switch 1733 connected in parallel to the capacitor 1731. The part (b) of FIG. 17 illustrates an example in which the switch 1733 is turned ON such that the field additive resonant unit 1730 is deactivated.

In an example of an electric vehicle charging system, a high amount of power in a kW range may be transmitted. Accordingly, by connecting the switch 1733 in parallel to the capacitor 1731, loss may be reduced and a circuit may be protected.

Figure 18:
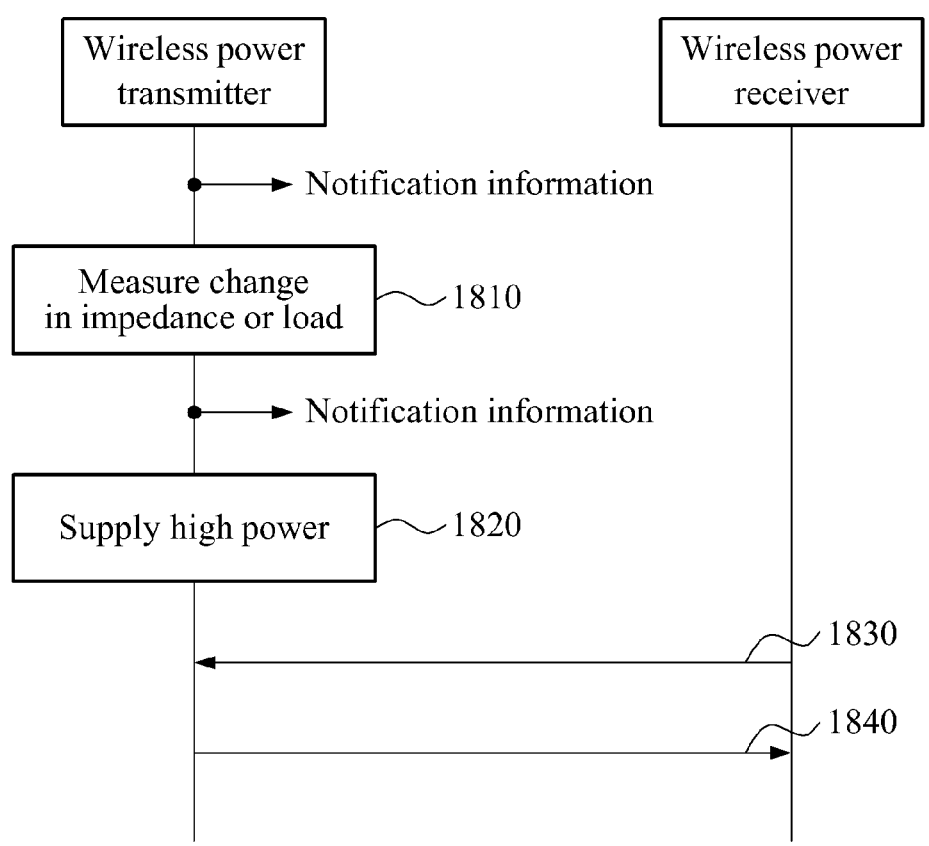
FIG. 18 is a diagram illustrating an example of an operating method of a wireless power transmission system.

FIG. 18 illustrates an example of an operating method of a wireless power transmission system. Referring to FIG. 18, a wireless power transmitter may include a resonant apparatus. A wireless power receiver may include a target resonator.

The wireless power transmitter transmits notification information periodically. In this example, the notification information may include a network identifier used to distinguish the wireless power transmitter from other wireless power transmitters.

In operation 1810, the wireless power transmitter supplies a low power to a source resonator, and measures or detects a change in a load or impedance of the source resonator. In this example, the source resonator may include, for example, the main resonant unit 610, the field guiding resonant unit 620, and the field additive resonant unit 630 of FIG. 6.

In operation 1820, the wireless power transmitter supplies a high power to the source resonator when the detected change in the load or impedance is greater than a predetermined value. In this example, the "low power" may refer to an amount of power less than 1 W, and the "high power" may refer to an amount of power greater than or equal to 5 W.

In addition, the wireless power transmitter may increase an amount of power supplied to the source resonator gradually by 5 W each time. For example, when the wireless power receiver corresponds to an electric vehicle, an amount of power supplied to the source resonator may increase by 1 kW up to 6.6 kW.

When the output power of the wireless power transmitter is increased in operation 1820, the wireless power receiver receives, from the wireless power transmitter, an amount of power to be used to activate a communication and control function.

When the communication and control function is activated, in operation 1830, the wireless power receiver transmits a search signal to the wireless power transmitter. The wireless power receiver may retransmit the search signal when a response to the search signal is not received within a predetermined time period. In this example, the search signal may include the network identifier included in the notification information.

The wireless power transmitter may determine whether the network identifier included in the search signal is identical to the network identifier included in the transmitted notification information. By determining whether the network identifiers are identical, the wireless power transmitter may identify an incorrectly connected wireless power receiver.

In operation 1840, the wireless power transmitter transmits a response signal with respect to the search signal, to the wireless power receiver.

Through the operations 1810 through 1840, the wireless power transmitter and the wireless power receiver are associated with each other via communication.

After the process of FIG. 18 is performed, the wireless power transmitter may detect a misalignment, and perform a method of controlling a resonance. The process of FIG. 18 may also be omitted.

The examples of the resonance control method described may include forming magnetic resonant coupling between a resonant apparatus and a target resonator. The resonance control method may further include detecting a misalignment between the resonant apparatus and the target resonator. The resonance control method may further include controlling an entirety or a portion of a plurality of sub-resonant units to be turned ON or OFF, based on a state of the misalignment.

In this example, the controlling may include receiving information on an amount of current or power received by the wireless power receiver through the magnetic resonant coupling, periodically. In addition, the controlling may include detecting a portion of the resonant apparatus that needs an enhancement of a magnetic field based on the state of the misalignment, and controlling a switch of a sub-resonant unit disposed in the portion needing the enhancement of the magnetic field to be turned OFF. When the switch of the sub-resonant unit is turned OFF, the sub-resonant unit may be activated. Further, the controlling may include detecting a portion of the resonant apparatus that needs a cancellation of the magnetic field based on the state of the misalignment, and controlling a switch of a sub-resonant unit disposed in the portion needing the cancellation of the magnetic field to be turned ON.

The various units, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a terminal or device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A resonant apparatus in a wireless power transmission system, the resonant apparatus comprising:

a main resonator configured to form magnetic resonant coupling between the resonant apparatus and a target resonator of a wireless power receiver;

a field guiding resonant unit configured to focus a magnetic field on an internal portion of the main resonator;

a field additive resonant unit configured to adjust a magnitude of a magnetic field formed between the main resonator and the field guiding resonant unit, and comprising a plurality of sub-resonant units; and a controller is configured to:
  receive state information from the wireless power receiver,
  detect a reflected wave of a charging power and misalignment between the main resonator and the target resonator based on the detected reflected wave, and
  control two or more of the plurality of sub-resonant units to be turned ON or OFF, based on the detected misalignment and/or the received state information, wherein the controller turns ON one or more sub-resonant units, among the sub-resonant units, disposed in a portion in which the resonant apparatus overlaps the target resonator, and turn OFF a remained of the sub-resonant units, wherein the state information includes efficiency information of power transmission and the efficiency information is calculated based on a ratio of an amount of received power to an amount of transmitted power.

2. The resonant apparatus of claim 1, wherein:
the field guiding resonant unit is disposed in the internal portion of the main resonant unit; and
the field additive resonant unit is disposed between the main resonant unit and the field guiding resonant unit.

3. The resonant apparatus of claim 1, wherein a resonant frequency of the field guiding resonant unit is controlled by a controller.

4. The resonant apparatus of claim 1, wherein a resonant frequency of the field guiding resonant unit is greater than or equal to an operating frequency of the resonant apparatus.

5. The resonant apparatus of claim 1, wherein each of the sub-resonant units comprises a capacitor and a switch connected in parallel to the capacitor.

6. The resonant apparatus of claim 1, wherein each of the main resonant unit and the field guiding resonant unit comprises a circular loop or a rectangular loop.

7. The resonant apparatus of claim 1, wherein the field additive resonant unit comprises circular loop conductors connected to the main resonant unit.

8. The resonant apparatus of claim 1, wherein:
the field guiding resonant unit and the field additive resonant unit comprises a loop in which ends of the field guiding resonant unit are connected to ends of the field additive resonant unit; and
a width of the field guiding resonant unit is narrower than a width of the field additive resonant unit.

* * * * *